United States Patent
Da Deppo et al.

(10) Patent No.: US 10,563,445 B2
(45) Date of Patent: Feb. 18, 2020

(54) STAGED LOAD AMPLIFIED POWER CLOSURE SYSTEM

(71) Applicants: Lynn D. Da Deppo, Bloomfield Hills, MI (US); Dave Newkirk, West Bloomfield, MI (US)

(72) Inventors: Lynn D. Da Deppo, Bloomfield Hills, MI (US); Ehab Kamal, Novi, MI (US); Steve Bauer, Clarkston, MI (US); Dave Newkirk, West Bloomfield, MI (US); Jeffrey Root, Howell, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 215 days.

(21) Appl. No.: 15/524,638

(22) PCT Filed: Nov. 6, 2015

(86) PCT No.: PCT/US2015/059506
§ 371 (c)(1),
(2) Date: May 5, 2017

(87) PCT Pub. No.: WO2016/073873
PCT Pub. Date: May 12, 2016

(65) Prior Publication Data
US 2017/0335618 A1    Nov. 23, 2017

Related U.S. Application Data

(60) Provisional application No. 62/076,907, filed on Nov. 7, 2014.

(51) Int. Cl.
*E06B 7/00*    (2006.01)
*E05F 15/619*    (2015.01)
(Continued)

(52) U.S. Cl.
CPC ............. *E05F 15/619* (2015.01); *B60J 5/047* (2013.01); *E05F 1/1041* (2013.01); *E05Y 2900/531* (2013.01)

(58) Field of Classification Search
CPC ............... B60R 11/04; B60R 2011/004; B60R 2011/0094; E05F 15/619; E05F 15/616;
(Continued)

(56) References Cited

U.S. PATENT DOCUMENTS 10,099,629 B2 * 10/2018 Da Deppo ............. B60R 11/04
2010/0040361 A1 *  2/2010 Schuetz ................. B60R 11/04
                                                                396/428

(Continued)

FOREIGN PATENT DOCUMENTS

GB        2493909 A      2/2013
WO    WO-2012/107547 A1  8/2012

OTHER PUBLICATIONS

International Searching Authority, International Search Report and Written Opinion for International Application No. PCT/US2015/059506, dated Jan. 12, 2016.

*Primary Examiner* — Chi Q Nguyen
(74) *Attorney, Agent, or Firm* — Honigman LLP; Matthew H. Szalach; Jonathan P. O'Brien

(57) ABSTRACT

A closure assembly includes a housing, a sensor, a door, and a primary actuator. The sensor is disposed within the housing. The door is supported by the housing and is movable between a closed position and an open position. The sensor is exposed when the door is in the open position. The primary actuator is operable to (i) apply a first force on the door to move the door from the closed position to the open position and (ii) apply a second force on the door to move the door from the closed position to the open position when the first force does not move the door into the open position.

20 Claims, 19 Drawing Sheets

(51) Int. Cl.
*B60J 5/04* (2006.01)
*E05F 1/10* (2006.01)

(58) Field of Classification Search
CPC ...... E05F 1/1041; B60J 5/047; H04N 5/2252; H04N 5/2253
USPC .......................................................... 49/70
See application file for complete search history.

(56) References Cited

U.S. PATENT DOCUMENTS

| | | | |
|---|---|---|---|
| 2013/0016219 A1* | 1/2013 | Hahner | B60R 11/04 348/148 |
| 2013/0209079 A1* | 8/2013 | Alexander | B60R 11/04 396/25 |
| 2013/0235204 A1* | 9/2013 | Buschmann | B60R 11/04 348/148 |
| 2013/0335624 A1* | 12/2013 | Barthel | B60R 11/04 348/373 |
| 2014/0085467 A1 | 3/2014 | Barthel | |
| 2014/0320654 A1* | 10/2014 | Dadeppo | G02B 27/0006 348/148 |
| 2015/0183366 A1* | 7/2015 | Da Deppo | B60R 11/04 701/2 |
| 2015/0258944 A1* | 9/2015 | Buschmann | B60R 11/04 348/373 |
| 2015/0258945 A1* | 9/2015 | Schutz | B60R 11/04 348/373 |
| 2017/0123294 A1* | 5/2017 | Ashtiani | B60R 11/04 |

* cited by examiner

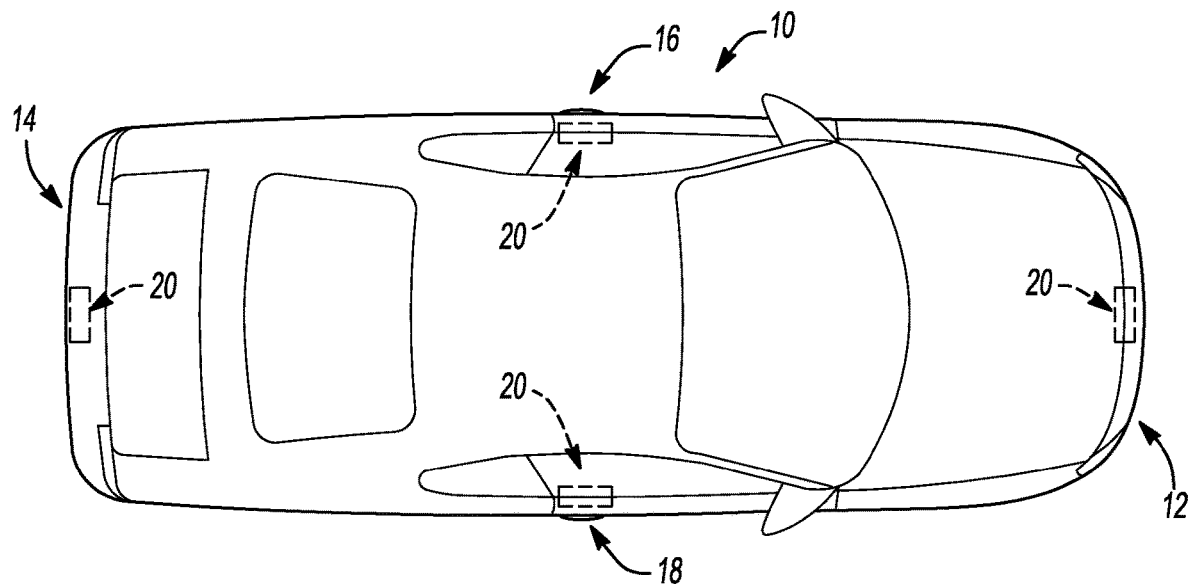
_Fig-1A_
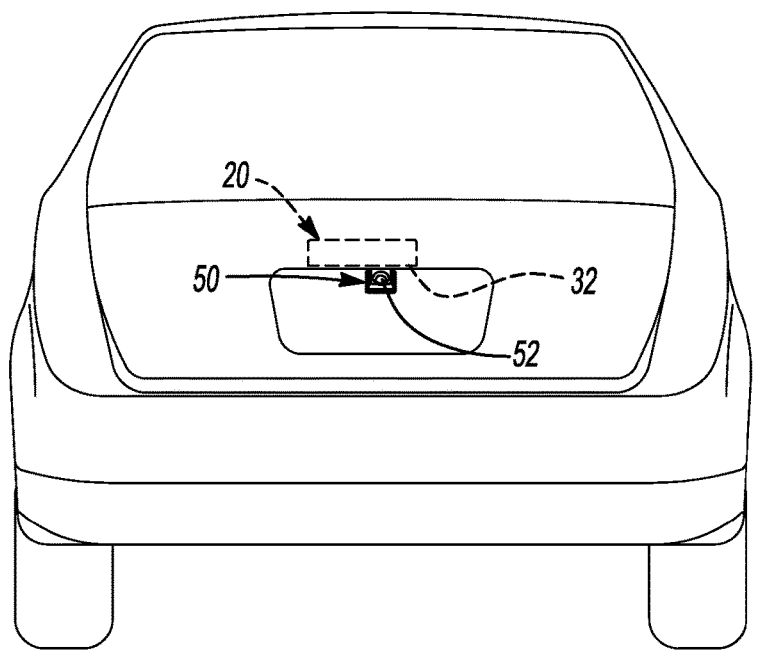
_Fig-1B_

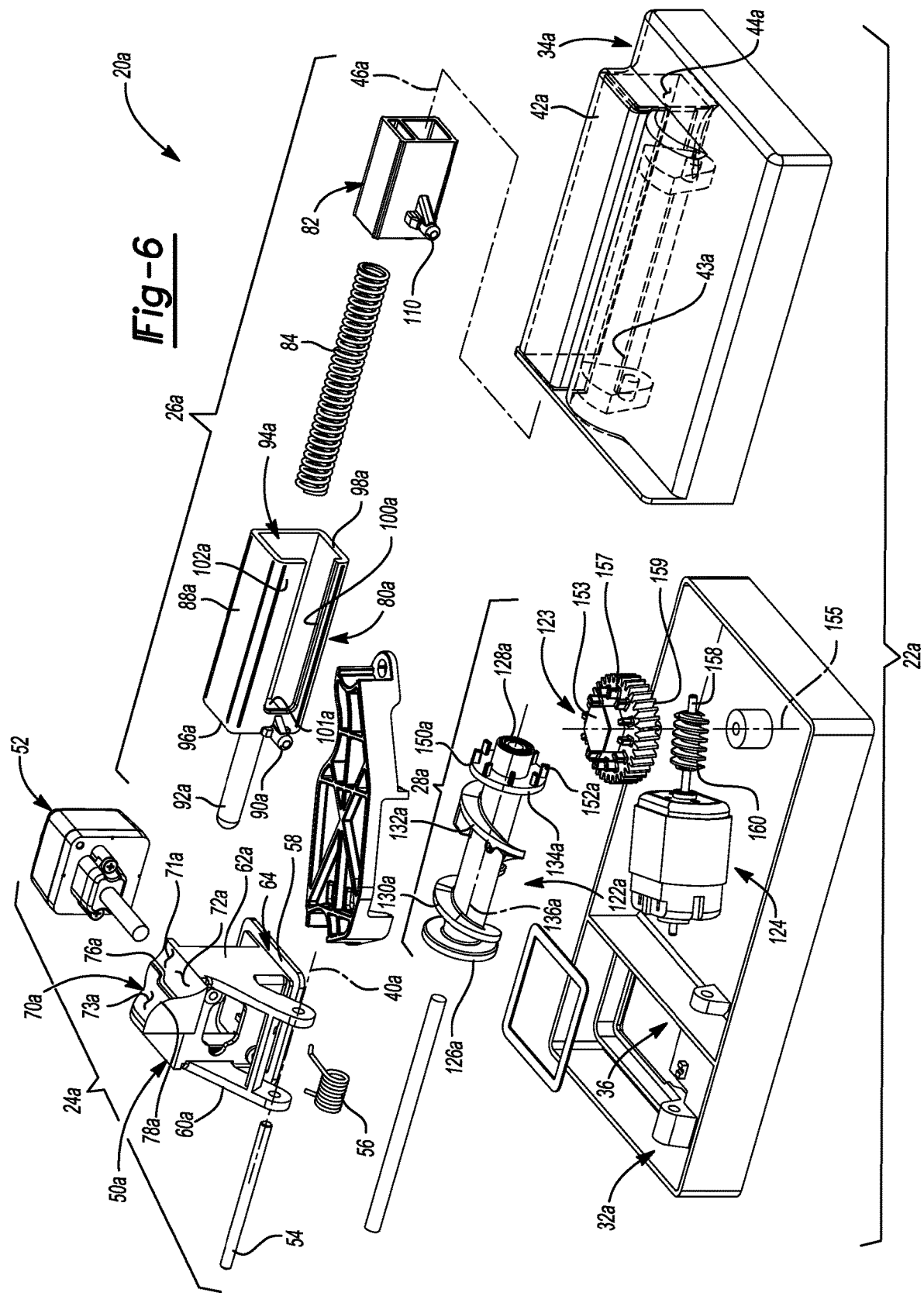

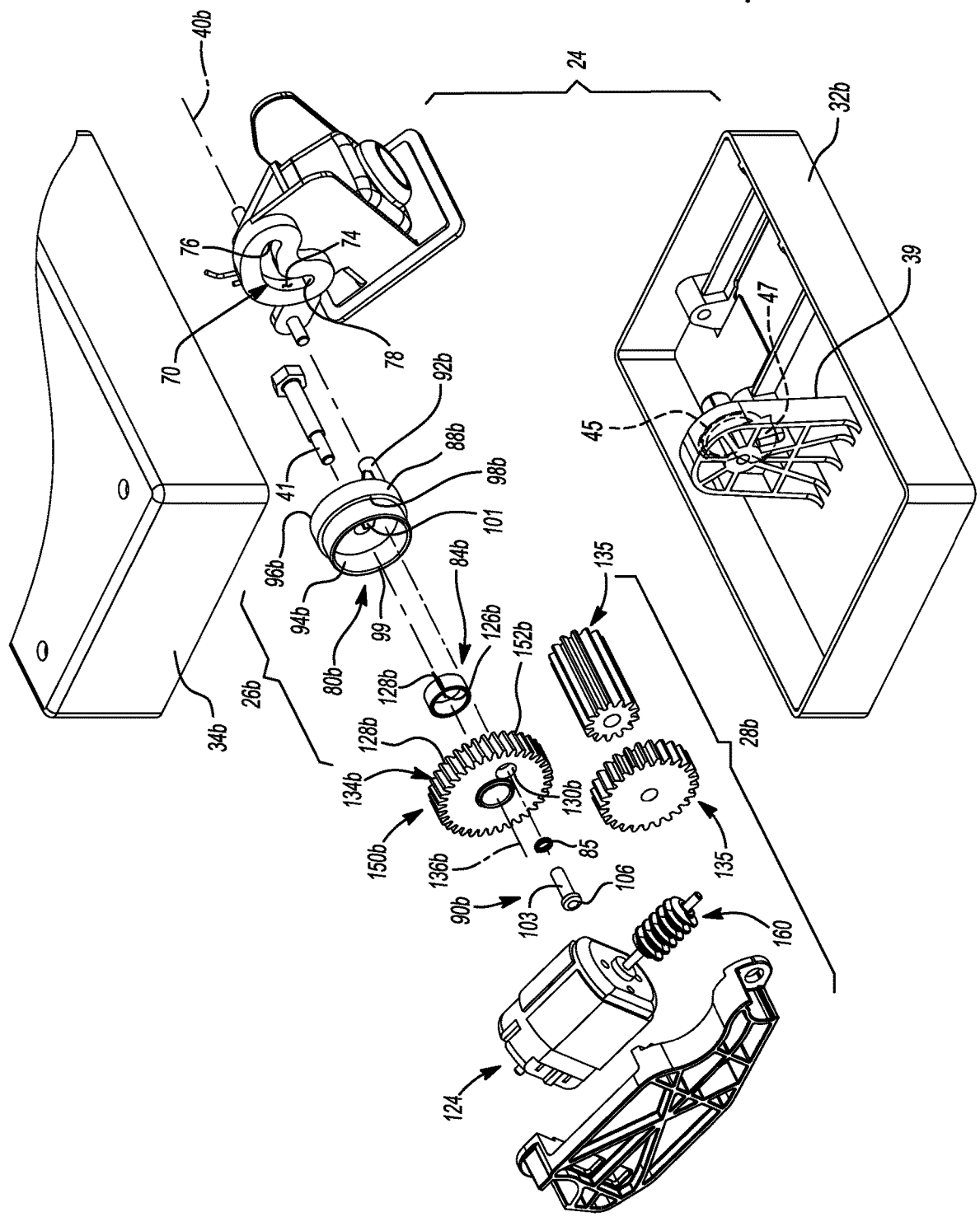

STAGED LOAD AMPLIFIED POWER CLOSURE SYSTEM

CROSS-REFERENCE TO RELATED APPLICATIONS

This application is the U.S. national phase of International Application No. PCT/US2015/059506, filed Nov. 6, 2015, which claims the benefit of U.S. Provisional Patent Application No. 62/076,907 filed on Nov. 7, 2014, the entire disclosures of which are incorporated herein by reference.

FIELD

The present disclosure relates generally to a staged load amplified closure system, and more particularly to a system and method for staged load closure and deployment of a sensor or camera.

BACKGROUND

This section provides background information related to the present disclosure and is not necessarily prior art.

Many motor vehicles now come equipped with some variation of a camera and sensor system to provide real-time monitoring or viewing of an area near the motor vehicle. For example, cameras, sensors, or both are often positioned on the front of the vehicle or on the rear of the motor vehicle. The cameras and sensors can detect the areas surrounding the vehicle that are not otherwise viewable with the conventional mirrors. Such cameras and sensors can be used to assist the vehicle operator in parking or maneuvering the vehicle during normal operation, for example.

To provide a consistent field of view, many camera and sensor systems do not include a cover and are fixedly directed at the space they are intended to monitor. Uncovered cameras and sensors are prone to damage from environmental conditions and exposure, including damage from dirt and stone chipping, and also from human intervention, including theft.

To better protect the camera, sensor, or other device, a deployable system may be utilized. In a deployable system, the sensor, camera, or other suitable device, may utilize an electric motor to drive the system between an open or "deployed" position and a closed or "stowed" position. The motor may be linked to a set of gears to provide a speed and torque realignment and a set of links and/or cams to provide the motion to activate the desired deployment and stowing of the camera or sensor. The system may be activated by various actions of a vehicle user. For example, to deploy the system, the vehicle user may place a gear selector into a reverse position, which may activate the electric motor in a first direction. To stow the system, the vehicle user may place the gear selector into a park, neutral, or drive position, which may activate the electric motor in a second direction opposite the first direction. In order to ensure that the system functions properly, it may be necessary to utilize a motor, gears, and/or linkage that is sufficiently strong to overcome various operational system loads incurred during deployment. For example, it may be necessary to utilize a motor, gears, and/or linkages that are sufficiently strong to overcome various forces that might otherwise prevent the system from deploying. In particular, it may be necessary to utilize a motor, gears, and/or linkages that can overcome friction, ice, mud, mechanical sealing, etc. that might otherwise prevent the system from deploying. Such motors, gears, and/or linkages may be expensive, heavy, and occupy a large packaging space within the vehicle.

SUMMARY

This section provides a general summary of the disclosure, and is not a comprehensive disclosure of its full scope or all of its features.

According to one aspect, a closure assembly is provided. The closure assembly may include a housing, a sensor, a door, and a primary actuator. The sensor may be disposed within the housing. The door may be supported by the housing and may be movable between a closed position and an open position. The sensor may be exposed when the door is in the open position. The primary actuator may be operable to (i) apply a first force on the door to move the door from the closed position to the open position and (ii) apply a second force on the door to move the door from the closed position to the open position when the first force does not move the door into the open position.

In some implementations, the second force is greater than the first force.

In some implementations, the door includes a control feature and the primary actuator includes a pin that engages the control feature to rotate the door from the closed position to the open position.

In some configurations, the control feature includes a slot. The slot may include a first cam surface and a second cam surface. In some implementations, the first cam surface is operable to control the movement of the door from the closed position to the open position, and the second cam surface is operable to control the movement of the door from the open position to the closed position.

In some configurations, the control feature includes a ramped surface. In some implementations, the ramped surface includes a concave portion and a convex portion extending from the concave portion.

In some configurations, the closure assembly includes a spindle and a driver. The driver may be operable to rotate the spindle. In some implementations, the spindle includes a first ramp that engages the primary actuator and a second ramp that engages a secondary actuator. In some configurations, the driver includes at least one of a motor and a shape-memory alloy that rotates the spindle.

In some implementations, the driver rotates the spindle in a first direction about an axis of rotation to move the door from the closed position to the open position. The driver may rotate the spindle in the first direction about the axis of rotation to rotate the door from the open position to the closed position.

In some configurations, the door is supported by the housing for rotation about an axis. The first force may produce a first torque about the first axis and the second force may produce a second torque about the first axis. In some implementations, the second torque is greater than the first torque.

According to another aspect, a closure assembly is provided. The closure assembly may include a housing, a sensor, a door, a primary actuator, and a secondary actuator. The sensor may be disposed within the housing. The door may be supported by the housing and may be movable between a closed position and an open position. The sensor may be exposed when the door is in the open position. The primary actuator may be operable to transmit a first impact to the door to move the door from the closed position to the open position. The secondary actuator may be operable to transmit a second impact to the door to move the door from the closed position to the open position when the first impact does not move the door into the open position.

In some implementations, a force generated by the second impact is greater than a force generated by the first impact.

In some configurations, the closure assembly includes an energy storage device configured to store a first amount of energy and a second amount of energy greater than the first amount of energy. The first amount of energy may produce the first impact, and the second amount of energy may produce the second impact.

According to yet another aspect, a method of operating a closure assembly is provided. The closure assembly may include a housing, a door movably coupled to the housing, and an actuator. The method may include storing a first amount of energy in an energy storage device and releasing the first amount of energy to move the door from a closed state to an open state. The method may further include storing a second amount of energy in the energy storage device if the door remains in the closed state following release of the first amount of energy. The second amount of energy may be greater than the first amount of energy. The method may also include releasing the second amount of energy to move the door from the closed state to the open state.

In some implementations, the method may also include exposing a sensor when the door is in the open state and hiding the sensor when the door is in the closed state.

In some implementations, releasing the first amount of energy includes producing a first momentum impulse with the first amount of energy to move the door from a closed state to an open state.

In some implementations, releasing the second amount of energy includes producing a second momentum impulse to move the door from the closed state to the open state. The second momentum impulse may be greater than the first momentum impulse.

According to a further aspect, a method of operating a closure assembly is provided. The closure assembly may include a housing, a door movably coupled to the housing, and an actuator. The method may include engaging the door with the actuator to apply a first force to move the door from a closed state to an open state to expose a sensor. The method may also include engaging the door with the actuator to apply a second force greater than the first force to move the door from the closed state to the open state to expose the sensor when the first force fails to move the door from the closed state to the open state.

In some implementations, the door is supported by the housing for rotation about a first axis. The first force may produce a first torque about the first axis and the second force producing a second torque about the first axis.

In some implementations, engaging the door with the actuator to produce the second force includes producing a first occurrence of the second force and a second occurrence of the second force.

In some configurations, the door includes a control feature and the actuator includes a pin. Engaging the door with the actuator may include moving the pin along a surface of control feature.

In some implementations, the closure assembly may include a spindle having a ramp surface. The method may further include rotating the spindle about an axis of rotation in a first direction such that the actuator engages the ramp surface to produce the first force.

In some implementations, the method may also include rotating the spindle in the first direction about the axis of rotation to produce the first force and the second force, and rotating the spindle in the first direction about the axis of rotation to produce a third force. The third force may be opposite the first force and the second force to move the door from the open state to the closed state.

In some implementations, the second force includes an impact force. In some configurations, the door is supported by the housing for rotation about a first axis. The first force may produce a first torque about the first axis and the impact force may produce a second torque about the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 1A is a top view of a vehicle having a deployable sensor assembly in accordance with the principles of the present disclosure;

FIG. 1B is an end view of the vehicle of FIG. 1A, showing the deployable sensor assembly in a deployed position in accordance with the principles of the present disclosure;

FIG. 6 is an exploded view of the closure assembly of FIG. 5A;

FIG. 9 is an exploded view of the closure assembly of FIG. 7.

Corresponding reference numerals indicate corresponding parts throughout the drawings.

DETAILED DESCRIPTION

Figure 2A:
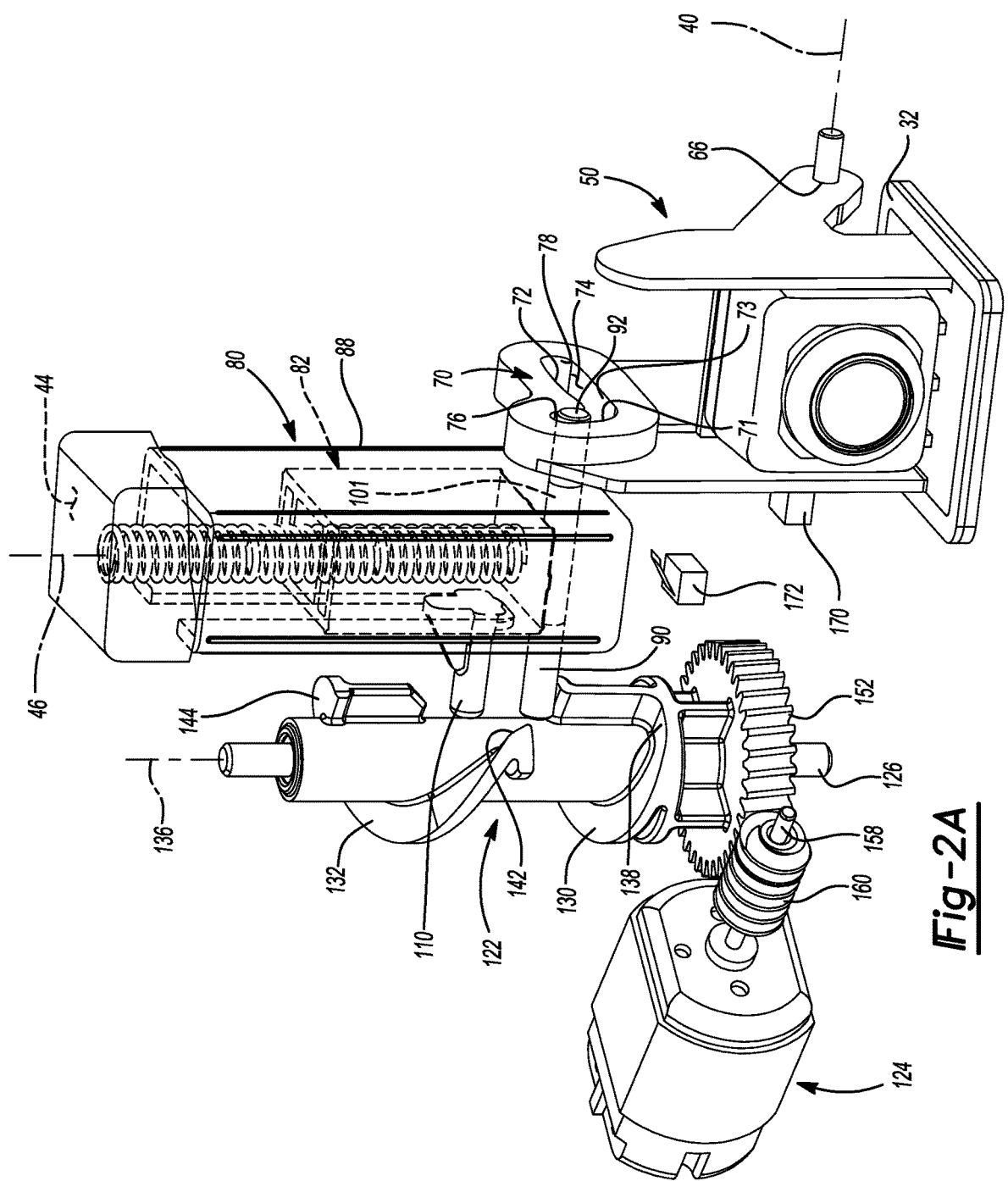
FIG. 2A is a perspective view of a deployable sensor assembly in a first position according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 2B:
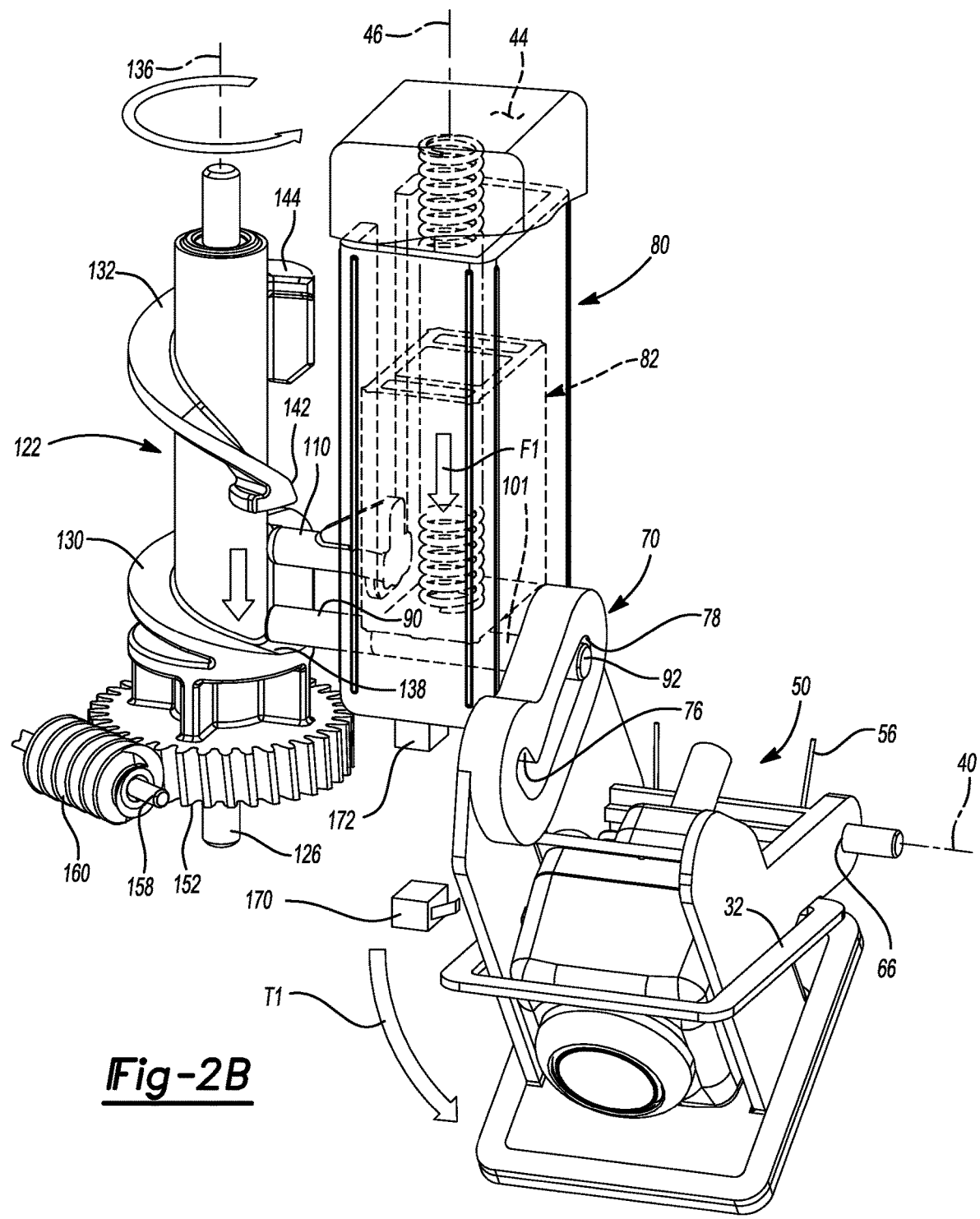
FIG. 2B is a perspective view of the deployable sensor assembly of FIG. 2A in a second position according to the principles of the present disclosure.

With reference to FIGS. 1A and 1B, a vehicle 10 is provided. The vehicle 10 may be any known variety of vehicle, such as a car, a truck, or a van for example. The vehicle 10 may include a front portion 12, a rear portion 14, a first side portion 16, a second side portion 18, and one or more deployable sensor assemblies 20. In some configurations, the vehicle 10 may include four sensor assemblies 20. For example, the vehicle 10 may include a first sensor assembly 20 disposed on the front portion 12 (e.g., disposed proximate a front bumper), a second sensor assembly 20 disposed on the rear portion 14 (e.g., disposed proximate a rear bumper), a third sensor assembly 20 disposed on the first side portion 16 (e.g., disposed proximate a driver's side door), and a fourth sensor assembly 20 disposed on the second side portion 18 (e.g., disposed proximate a passenger's side door). As will be explained in more detail below, the position of each sensor assembly 20 may be selectively controllable relative to the vehicle 10. In particular, the sensor assemblies 20 may be movable (e.g., rotatable, pivotable, translatable, etc.) between a stowed or closed position (FIG. 2A) and a deployed or open position (FIGS. 1B and 2B). In the open position, the sensor assembly 20 can communicate with an end user (e.g., a driver of the vehicle 10) via audio and/or visual signals (e.g., via an infotainment display) in order to notify the end user of various environmental conditions in an area surrounding the vehicle 10.

Figure 2C:
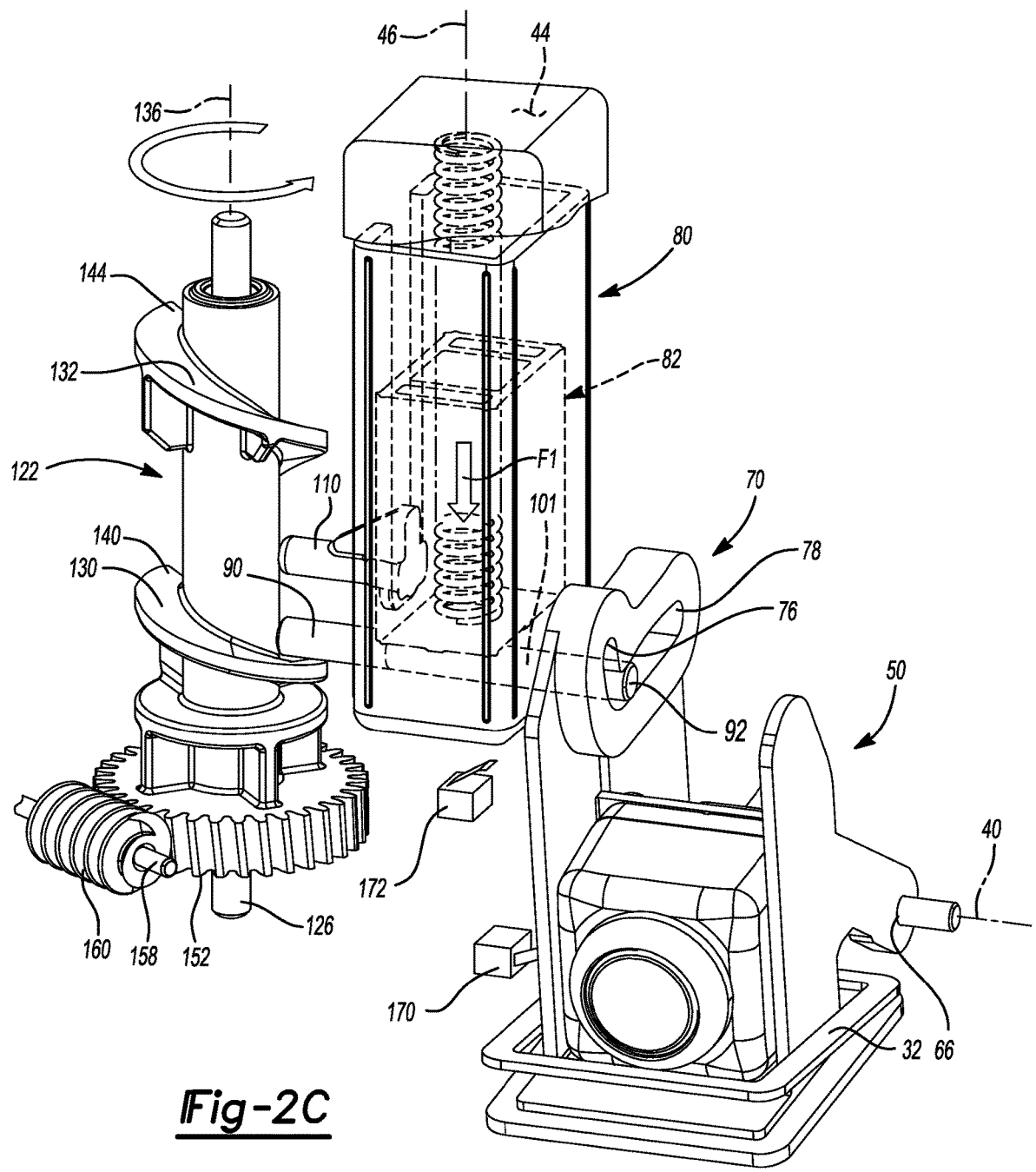
FIG. 2C is a perspective view of the closure assembly of FIG. 2A in a third position according to the principles of the present disclosure.
Figure 2D:
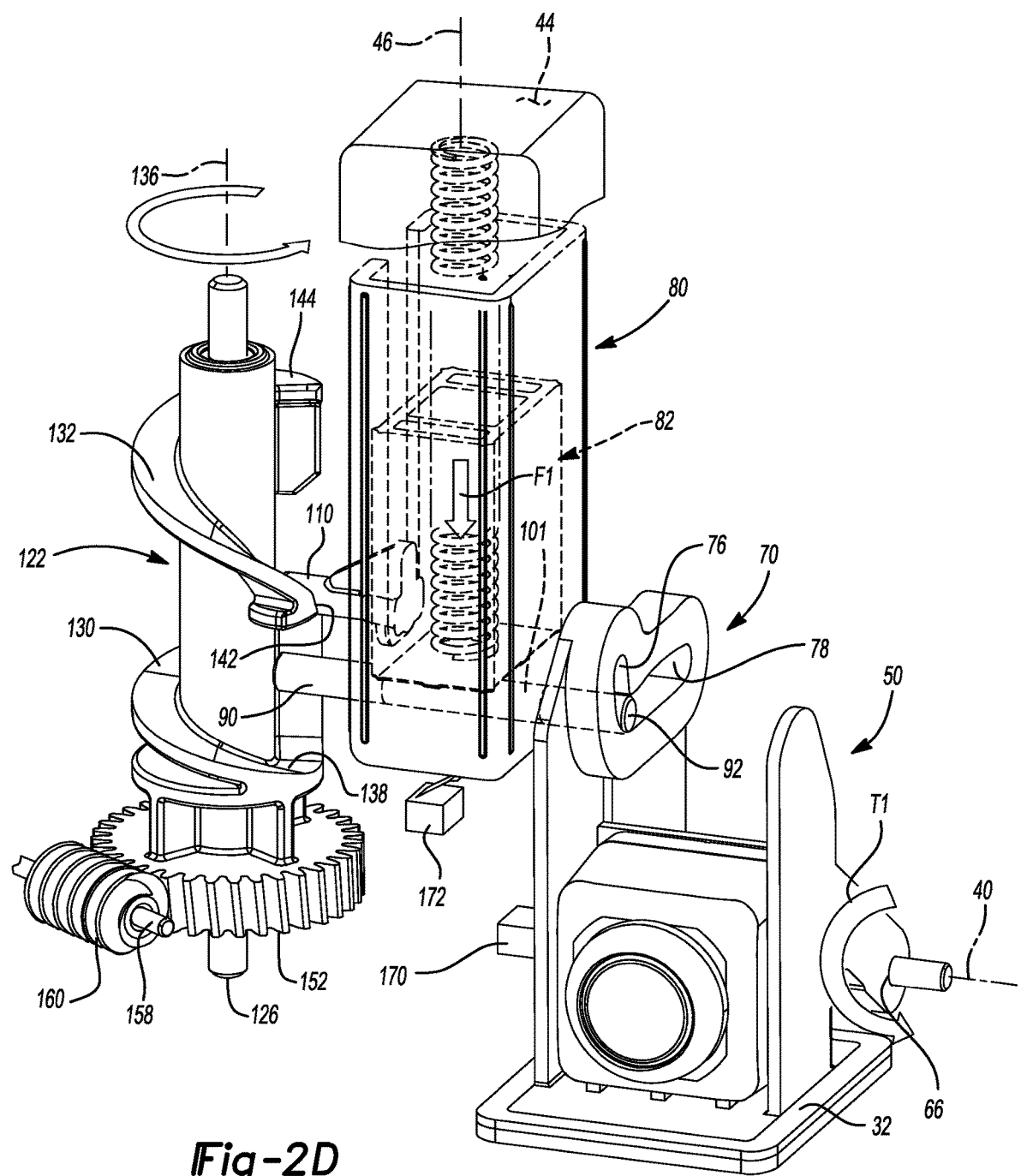
FIG. 2D is a perspective view of the closure assembly of FIG. 2A in a fourth position according to the principles of the present disclosure.
Figure 2E:
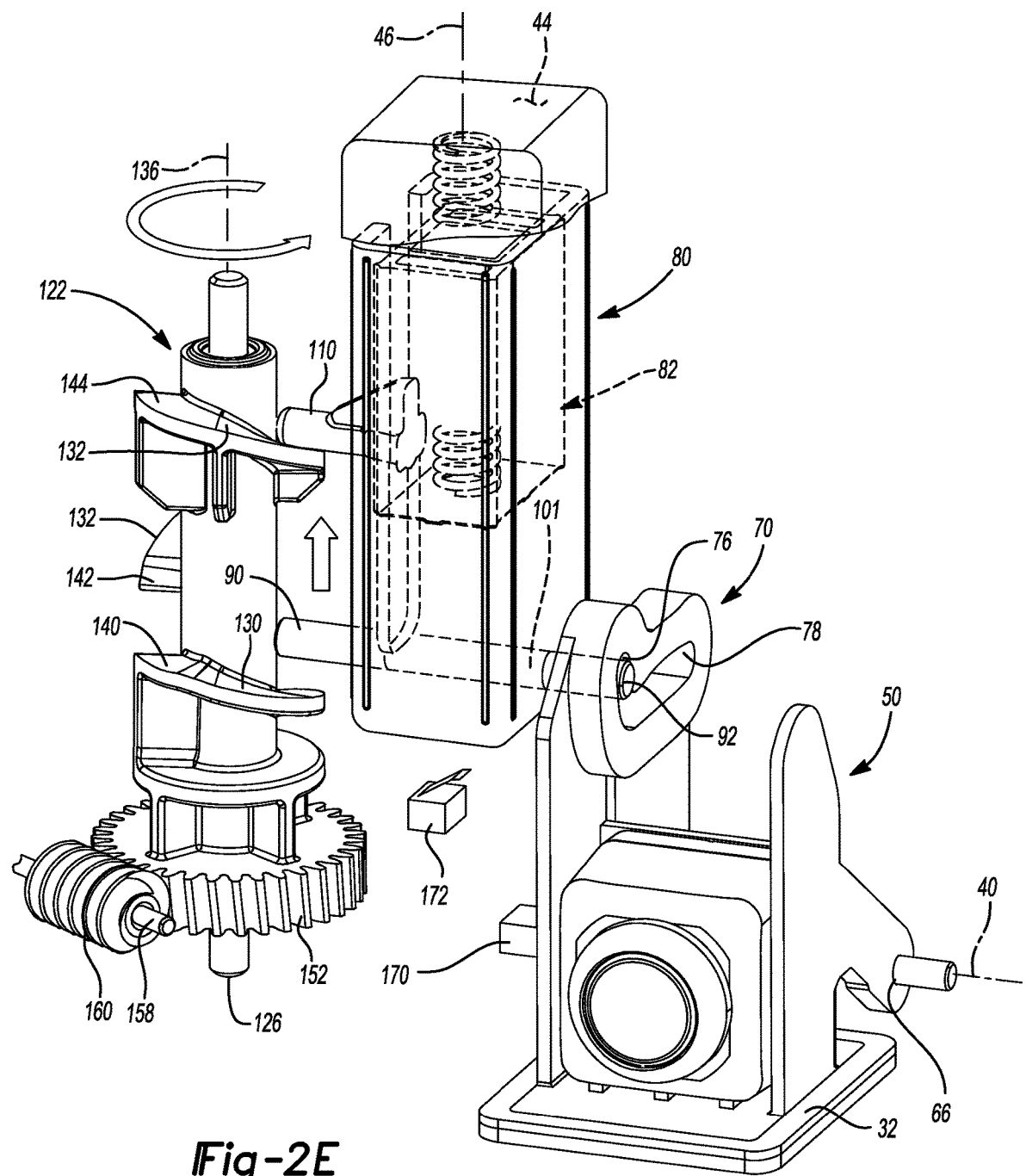
FIG. 2E is a perspective view of the closure assembly of FIG. 2A in a fifth position according to the principles of the present disclosure.
Figure 2F:
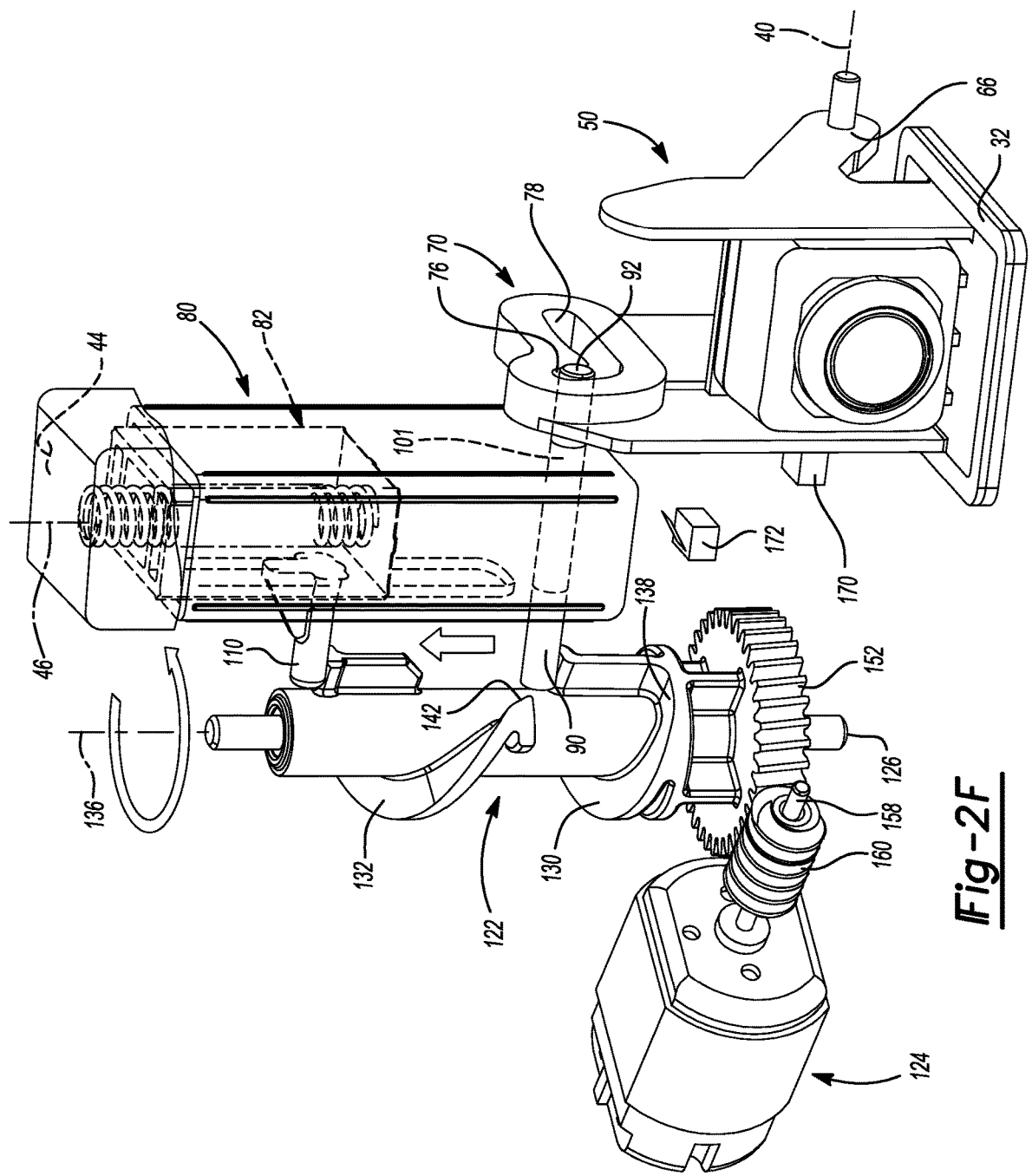
FIG. 2F is a perspective view of the closure assembly of FIG. 2A in a sixth position according to the principles of the present disclosure.
Figure 2G:
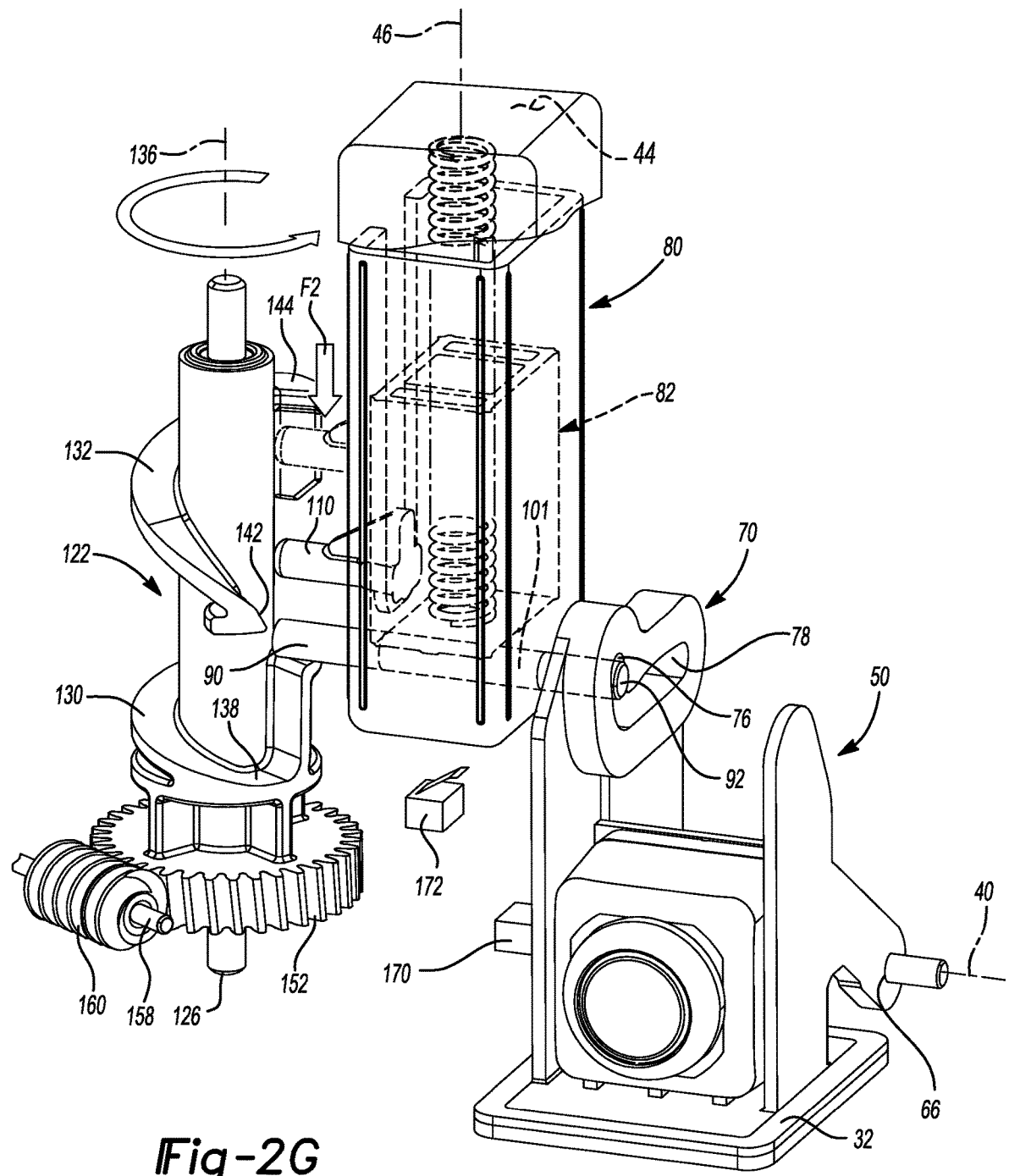
FIG. 2G is a perspective view of the closure assembly of FIG. 2A in a seventh position according to the principles of the present disclosure.
Figure 2H:
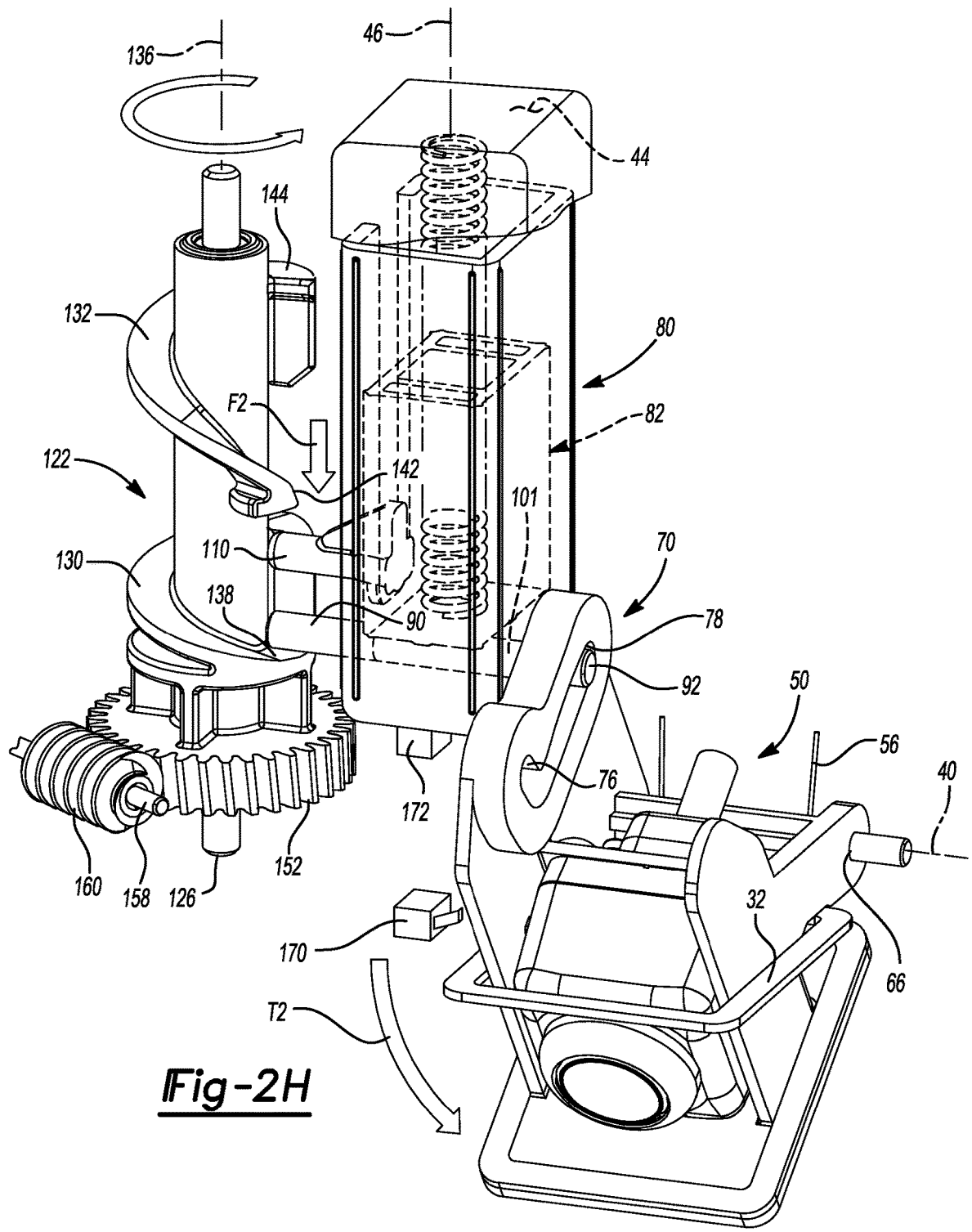
FIG. 2H is a perspective view of the closure assembly of FIG. 2A in an eighth position according to the principles of the present disclosure.
Figure 3:
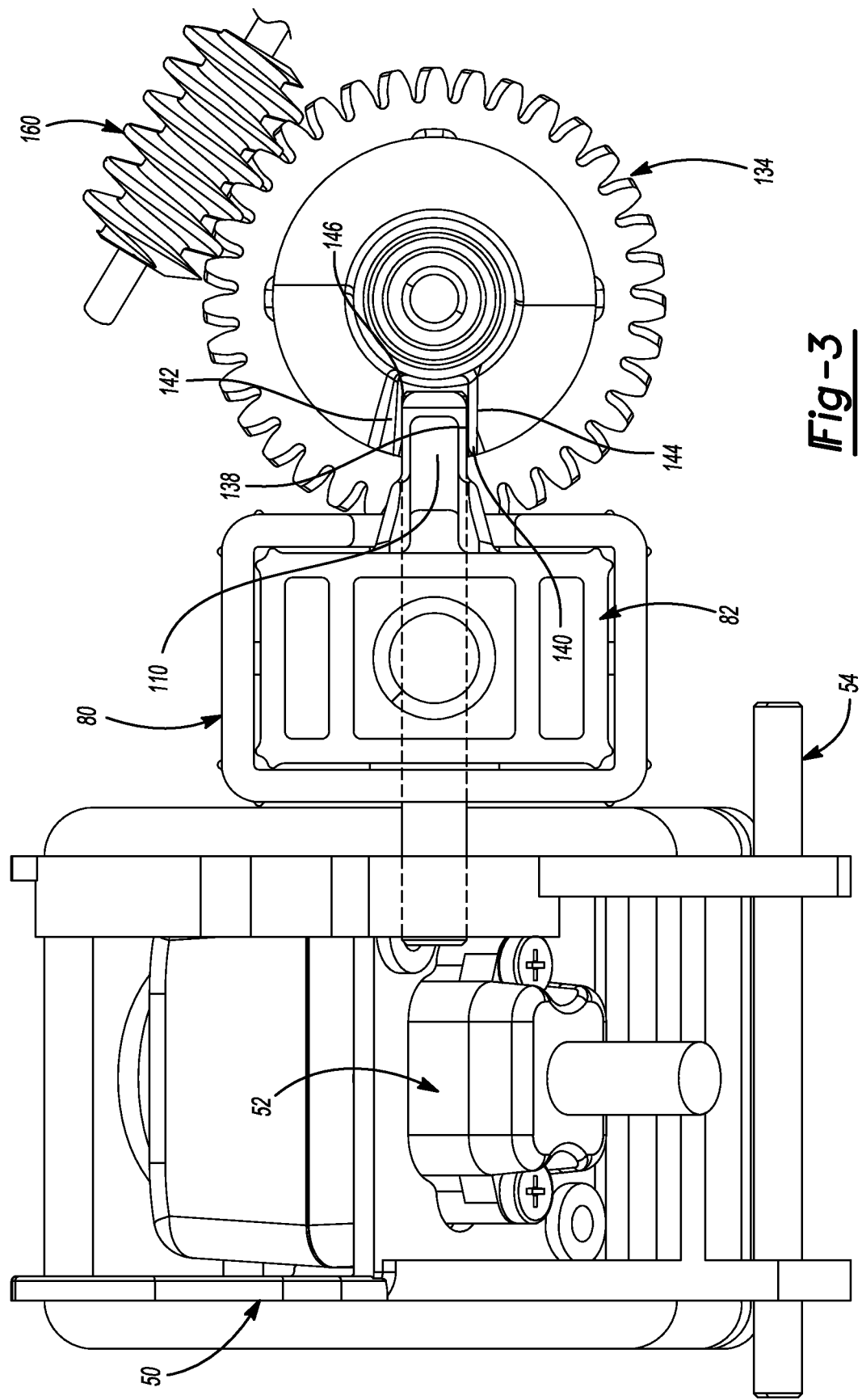
FIG. 3 is a top view of the closure assembly of FIG. 2A in the seventh position.
Figure 4:
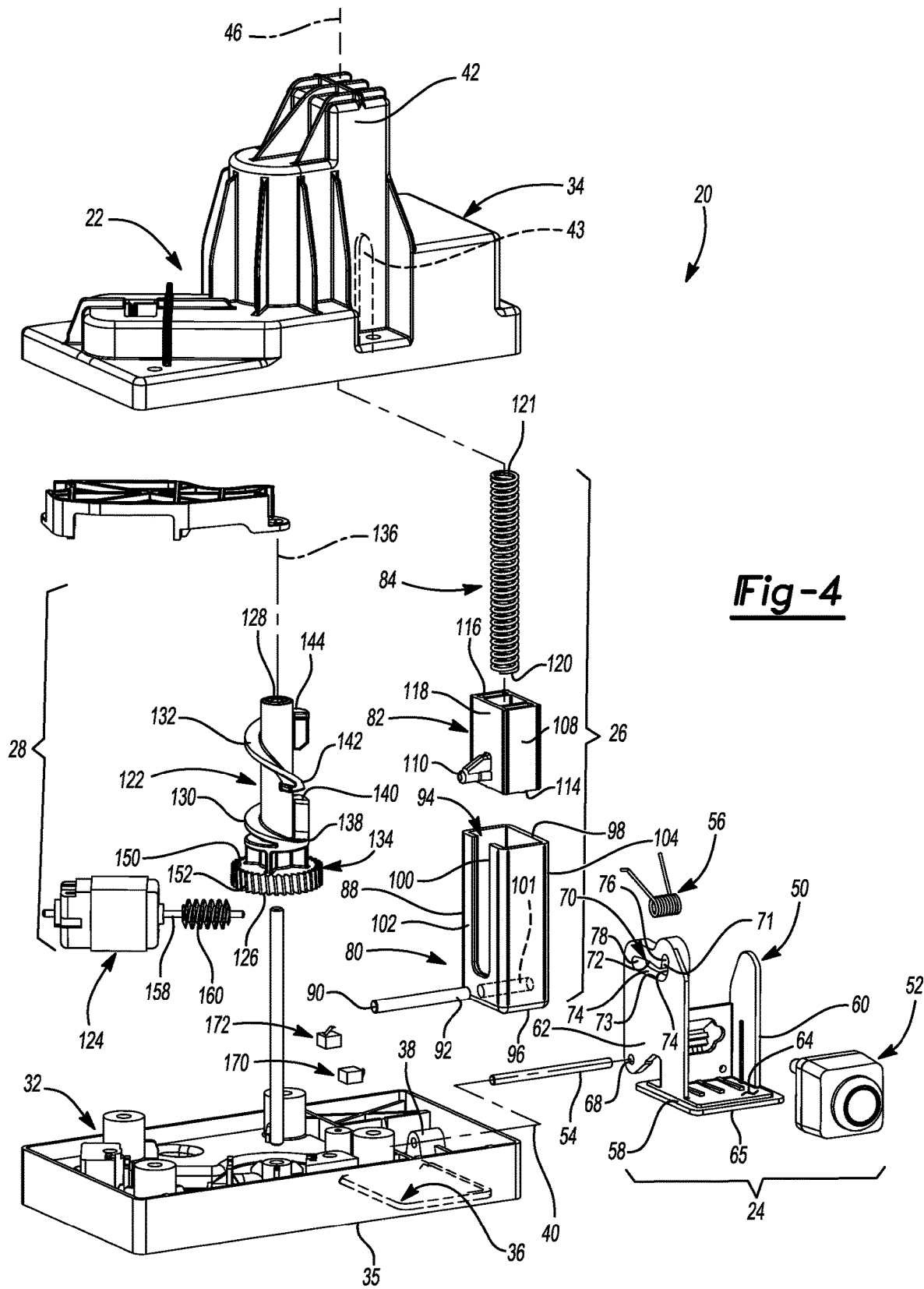
FIG. 4 is an exploded view of the closure assembly of FIG. 2A.

With reference to FIGS. 2A-4, the sensor assembly 20 may include a housing subassembly 22, a door subassembly 24, an actuator subassembly 26, and a driver subassembly 28. As illustrated in FIG. 4, the housing subassembly 22 may include a base 32 and a cover 34. The base 32 may include a lower surface 35, an aperture 36 and a rotation feature 38 (e.g., a hub or an axle mount). The aperture 36 may extend through the base 32 such that the lower surface 35 generally surrounds the aperture 36. The rotation feature 38 may define a first axis of rotation 40. As will be explained in more detail below, in an assembled configuration, the aperture 36 and rotation feature 38 may receive the door subassembly 24. In particular, the door subassembly 24 may be mounted to the rotation feature 38 for rotation about the first axis of rotation 40, such that the door subassembly 24 is receivable within the aperture 36 in a stowed or closed position (FIG. 2A) and a deployed or open position (FIG. 2B).

The cover 34 may include a chamber 42 having a slot 43 and a stop surface 44. The chamber 42 may define a generally cylindrical construct (e.g., a circular cylinder, a rectangular cylinder, or other polygonal cylinder) defining a path (e.g., linear path and/or an arcuate path) having a first translational axis 46 extending through the stop surface 44. As illustrated in FIG. 2A, the first translational axis 46 may extend in a direction substantially perpendicular (e.g., +/−5 degrees) to the first axis of rotation 40. As will be explained in more detail below, in the assembled configuration, the chamber 42 may receive the actuator subassembly 26 for translation along the first translational axis 46.

As illustrated in at least FIG. 4, the door subassembly 24 may include a door 50 and a sensing device 52, such as a camera or a motion sensor, for example, an axle 54, and a biasing member 56. The door 50 may include a baseplate 58, a first support arm 60, and a second support arm 62. The baseplate 58 may include an upper surface 64 and a lower surface 65 opposite the upper surface 64. In some configurations, the lower surface 65 includes a substantially planar construct such that when the door subassembly 24 is received by the aperture 36 of the base 32, the lower surface 65 of the baseplate 58 is substantially coplanar with the lower surface 35 of the base 32.

The first and second support arms 60, 62 may extend from the upper surface 64 of the baseplate 58. For example, in some configurations the first and second support arms 60, 62 may extend in a direction generally orthogonal to the upper surface 64 of the baseplate 58. The first support arm 60 may include a rotation feature 66 (e.g., a hub or an axle). The second support arm 62 may include a rotation feature 68 (e.g., a hub or an axle) and a control feature 70. In the assembled configuration, the rotation features 66, 68 of the first and second support arms 60, 62, respectively, may be coupled to the rotation feature 38 of the base 32 for rotation about the first axis of rotation 40. For example, in some configurations, the rotation features 38, 66, 68 may each include a hub. The axle 54 may be substantially aligned with the first axis of rotation 40 and disposed within one or more of the rotation features 38, 66, 68 such that the door subassembly 24 can pivot about the axis of rotation 40 between the closed position (FIG. 2A) and the open position (FIG. 2B). In some configurations, the biasing member 56 may include a spring (e.g., a torsional spring, a compression spring, a leaf spring, etc.) disposed about the axis of rotation 40 (e.g., disposed about the axle 54) and biasing the door subassembly 24 from the open position (FIG. 2B) to the closed position (FIG. 2A), or vice versa.

The control feature 70 may include slot extending through the second support arm 62. In some configurations, the slot of the control feature 70 may include a generally L-shaped construct having a first leg 71 extending transversely from a second leg 73. The first and second legs 71, 73 may include an L-shaped upper surface 72, an L-shaped lower surface 74 opposite the L-shaped upper surface 72, and end surfaces 76, 78 extending from the upper surface 72 to the lower surface 74. In other configurations, the upper surface 72 may include a concave configuration and the lower surface 74 may include a convex configuration. In this regard, a radius of curvature of the upper surface 72 may be substantially equal to a radius of curvature of the lower surface 74 such that the upper surface 72 is substantially parallel to the lower surface 74. As will be explained in more detail below, the control feature 70 can control the movement of the door 50 relative to the housing subassembly 22. In this regard, the upper surface 72 may define, and be referred to herein, as a cam surface 72 (e.g., a first cam surface), and the lower surface 74 may define, and be referred to herein, as a cam surface 74 (e.g., a second cam surface). The cam surfaces 72, 74 can control the movement of the door 50 (e.g., opening and/or closing) by engaging with the actuator subassembly 26.

The sensing device 52 may be coupled to the door 50. For example, in some configurations the sensing device 52 may be supported by the upper surface 64 of the baseplate 58 between the first and second support arms 60, 62. Accordingly the sensing device 52 may rotate with the door 50 between the open position (FIG. 2B) and the closed position (FIG. 2A) such that the sensing device 52 can sense (e.g., capture video) an environment outside of the housing subassembly 22 in the open position.

As illustrated in FIGS. 2A and 4, the actuator subassembly 26 may include a primary actuator 80, a secondary actuator 82, and an energy storage device such as a biasing member 84. The primary actuator 80 may include a block 88, first pin 90, and a second pin 92. The block 88 may include a generally hollow construct defining an inner chamber 94. In some configurations, the block 88 may include a generally circular cylindrical shape. It will be appreciated, however, that the block 88 may include other cross-sectional shapes and configurations, such as an ellipse, a square, or other polygonal shape, within the scope of the present disclosure. The block 88 may include a proximal end 96, a distal end 98 opposite the proximal end 96, and a slot 100. The slot 100 may extend through the block 88 and into the chamber 94 from the distal end 98 toward the proximal end 96. The proximal end 96 of the block 88 may define a stop surface 101 facing the distal end 98 of the block 88.

The first pin 90 may extend from a first lateral side 102 of the block 88, and the second pin 92 may extend from a second lateral side 104 of the block 88. The first lateral side 102 may be opposite the second lateral side 104. Accordingly, the first pin 90 may extend in a direction substantially parallel to the second pin 92. In some configurations, the first pin 90 may be aligned and/or collinear with the second pin 92. In this regard, in some configurations, the first and second pins 90, 92 may define a integrally and/or monolithically formed and linearly extending construct.

In the assembled configuration, the slot 100 may extend in a direction substantially parallel to the first translational axis 46. In this regard, the primary actuator 80 may be disposed within the chamber 42 of the cover 34 such that the distal end 98 faces the stop surface 44 of the cover 34, and such that the chamber 42 is in communication with the inner chamber 94 of the block 88. In particular, the primary actuator 80 may be translatably disposed within the chamber 42 such that the block 88 can translate in a direction substantially parallel to the first translational axis 46 and to the slot 100. In this regard, in the assembled configuration, the first pin 90 may extend through the slot 43 of the cover 34, and the second pin 92 may extend through the control feature 70 (e.g., the arcuate slot) of the door 50.

The secondary actuator 82 may include a hammer 108 and a third pin 110. The hammer 108 may define a generally prismatic construct extending from a proximal end 114 to a distal end 116. The third pin 110 may extend from a first lateral side 118 of the hammer 108. The mass of the secondary actuator 82, including the hammer 108 and/or the third pin 110, may be greater than a mass of the primary actuator 80. For example, the mass of the secondary actuator 82 may be between 20 grams and 100 grams. In this regard, the secondary actuator 82, including the hammer 108 and/or the third pin 110, may be formed from a metal such as steel, zinc, iron, or an alloy thereof.

In the assembled configuration, the secondary actuator 82 may be disposed within the inner chamber 94 of the primary actuator 80. In particular, the secondary actuator 82 may be translatably disposed within the inner chamber 94 such that the secondary actuator 82 can translate in a direction substantially parallel to the first translational axis 46. In this regard, the third pin 110 may be translatably disposed within the slot 100 of the block 88 and within the slot 43 of the cover 34. Accordingly, the third pin 110 may extend in a direction substantially parallel to the first pin 90 of the primary actuator 80.

The biasing member 84 may include a proximal end 120 and a distal end 121. In some configurations, the biasing member 84 may be a compression coil spring extending from the proximal end 120 to the distal end 121. In the assembled configuration, the biasing member 84 may be disposed within the chamber 94 of the block 88. For example, the biasing member 84 may be disposed within the chamber 94 such that the proximal end 120 engages the hammer 108 of the secondary actuator 82 and the distal end 121 engages the stop surface 44 of the cover 34. Accordingly, as will be explained in more detail below, upon translation of the secondary actuator 82 in the direction of the stop surface 44, the secondary actuator 82 may compress the biasing member 84 in order to increase the elastic potential energy stored within the biasing member 84.

As illustrated in FIGS. 2A and 4, the driver subassembly 28 may include a spindle 122 and a driver 124. The spindle 122 may include a proximal end 126, a distal end 128, a primary ramp 130, a secondary ramp 132, and a drive mechanism 134. The spindle 122 may extend from the proximal end 126 to the distal end 128 along a second axis of rotation 136. As illustrated in FIG. 2A, the second axis of rotation 136 may extend in a direction substantially perpendicular (e.g., +/−5 degrees) to the first axis of rotation 40.

The primary ramp 130 may extend radially outwardly from the spindle 122 from a proximal end 138 to a distal end 140. The primary ramp 130 may extend helically about the second axis of rotation 136 such that the proximal end 138 is aligned with the distal end 140 about the second axis of rotation 136. In particular, the proximal and distal ends 138, 140 may define a line extending in a direction substantially parallel to the second axis of rotation 136.

The secondary ramp 132 may extend radially outwardly from the spindle 122 from a proximal end 142 to a distal end 144. The secondary ramp 132 may extend helically about the second axis of rotation 136 such that the proximal end 142 is offset relative the distal end 140 about the second axis of rotation 136. In particular, as illustrated in FIG. 3, the proximal and distal ends 142, 144 of the secondary ramp 132 may define a gap 146 extending about the second axis of rotation 136. The distal end 144 of the secondary ramp 132 may be aligned with the proximal and distal ends 138, 140 of the primary ramp 130, such that the distal end 144 of the secondary ramp 132 and the proximal and distal ends 138, 140 of the primary ramp 130 define a line extending in a direction substantially parallel to the second axis of rotation 136.

The drive mechanism 134 may include a gear wheel 150. In some configurations, the gear wheel 150 may be disposed proximate to the proximal end 126 of the spindle 122. The gear wheel 150 may include a series of gear teeth 152. Rotation of the gear wheel 150 may cause the spindle 122 to rotate about the second axis of rotation 136.

In some configurations, the driver 124 may include one or more mechanisms configured to rotate the spindle 122 about the second axis of rotation 136. For example, as illustrated in FIGS. 2A-4, in some configurations, the driver 124 may include an electric motor. As will be explained in more detail below, however, the driver 124 may include other mechanisms (e.g., a shape-memory alloy driven mechanism, a hydraulically driven mechanism, a pneumatically driven mechanism, etc.) configured to rotated the spindle 122 about the second axis of rotation 136, within the scope of the present disclosure. The driver 124 may further include a driveshaft 158 and a worm gear 160. In the assembled configuration, the worm gear 160 may be engaged with the gear teeth 152 of the drive mechanism 134 such that rotation of the worm gear 160 by the driver 124 causes the rotation of the spindle 122 about the second axis of rotation 136.

A method of operating the sensor assembly 20 will now be described with reference to FIGS. 2A-2H. As illustrated in FIG. 2A, a first mode of operation may begin with the door subassembly 24 in a closed position such that the lower surface 65 of the baseplate 58 is substantially coplanar with the lower surface 35 of the base 32. In the closed position, the second pin 92 of the primary actuator 80 may be disposed in the first leg 71 of the control feature 70. In particular, the end 76 and/or the upper surface 72 of the control feature 70 may engage the second pin 92 such that the door subassembly 24 is supported in the closed position by the second pin 92.

In a first mode of operation, the first pin 90 may be disposed on the primary ramp 130. In particular, when the door subassembly 24 is in the closed position, the first pin 90 may be disposed at the distal end 140 of the primary ramp 130. During the first mode of operation, the driver subassembly 28 may receive an instruction to activate the driver 124. In particular, the driver 124 (e.g., a motor) may receive an activation signal causing the driver 124 to rotate in a first direction. For example, in some configurations, an end user of the motor vehicle may shift the motor vehicle into reverse, which may send the activation signal to the driver 124, causing the driveshaft 158 and the worm gear 160 to rotate in the first direction.

As the worm gear 160 rotates in the first direction, the worm gear 160 engages the gear teeth 152 of the drive mechanism 134, causing the spindle 122 to rotate in a second direction about the second axis of rotation 136. As the spindle 122 rotates in the second direction, the first pin 90 may disengage the primary ramp 130. In particular, the first pin 90 may translate in a first direction, substantially parallel to the translational axis 46, from the distal end 140 of the primary ramp 130 to the proximal end 138 of the primary ramp 130. In this regard, the biasing member 84 may apply a force F1 on the secondary actuator 82, urging the secondary actuator 82 in the direction of the primary actuator 80, and, in turn, urging the primary actuator 80 in the first direction. As the first pin 90 translates in the first direction, the first pin 90 of the primary actuator 80 and the third pin 110 of the secondary actuator 82 may translate within the slot 43 of the cover 34, and the second pin 92 of the primary actuator 80 may translate within the control feature 70 of the door subassembly 24. For example, the second pin 92 may disengage the end 76 and/or the upper surface 72 of the control feature 70 and engage the lower surface 74 of the control feature 70. In this regard, the second pin 92 may apply a force on the lower surface 74, creating a first torque impulse T1 about the rotational axis 40 of the door subassembly 24, and causing the door subassembly 24 to rotate about the rotational axis 40. In some configurations, the biasing member 56 may cause the door subassembly 24 to rotate about the rotational axis 40 in lieu of, or in addition to, the first torque T1 created by the second pin 92. As the door subassembly 24 rotates about the rotational axis 40 into the open position (FIG. 2B), the second pin 92 may translate within the control feature 70 from the end 76 to the end 78 until the door subassembly 24 reaches the open position.

When the door subassembly 24 reaches the open position, the driver subassembly 28 may receive an instruction to deactivate the driver 124. In particular, the driver subassembly 28 may receive a signal causing the driveshaft 158 to stop rotating. For example, the sensor assembly 20 may include a first limit switch 170. In some configurations, the first limit switch 170 may be disposed between the door subassembly 24 and the housing subassembly 22. Accordingly, when the door subassembly 24 rotates from the first position (FIG. 2A) to the second position (FIG. 2B), the first limit switch 170 may be switched to an "OFF" position, thereby deactivating the driver 124.

In a second mode of operation, the first pin 90 may be disposed on the primary ramp 130. In particular, when the door subassembly 24 is in the open position (FIG. 2B), the first pin 90 may be disposed at the proximal end 138 of the primary ramp 130. During the second mode of operation, the driver subassembly 28 may receive an instruction to activate the driver 124. In particular, the driver 124 (e.g., a motor) may receive an activation signal causing the driver 124 to rotate in the first direction. For example, in some configurations, an end user of the motor vehicle may shift the motor vehicle into neutral or drive, which may send the activation signal to the driver 124, causing the driveshaft 158 and the worm gear 160 to rotate in the first direction.

As the worm gear 160 rotates in the first direction, the worm gear 160 engages the gear teeth 152 of the drive mechanism 134, causing the spindle 122 to rotate in the second direction about the second axis of rotation 136. With reference to FIG. 2C, as the spindle 122 rotates in the second direction, the first pin 90 may move along the primary ramp 130. In particular, the first pin 90 may move along the helical path of the primary ramp 130 from the proximal end 138 of the primary ramp 130 to the distal end 140 of the primary ramp 130. As the first pin 90 moves along the primary ramp 130, the first pin 90 of the primary actuator 80 and the third pin 110 of the secondary actuator 82 may translate within the slot 43 of the cover 34, and the second pin 92 of the primary actuator 80 may translate within the control feature 70 of the door subassembly 24, as the primary and secondary actuators 80, 82 translate along the translational axis 46 within the chamber 42 of the cover 34. In this regard, the second pin 92 may disengage the end 78 of the control feature 70 and engage the upper surface 72 of the control feature 70. The second pin 92 may apply a force on the upper surface 72, creating a torque about the rotational axis 40 of the door subassembly 24, and causing the door subassembly 24 to rotate about the rotational axis 40. The torque created by the second pin 92 may be greater than an opposing torque generated by the biasing member 56 and/or the biasing member 84. Accordingly, as the primary and secondary actuators 80, 82 translate within the chamber 42 toward the stop surface 44, the secondary actuator 82 may compress the biasing member 84 as the second pin 92 moves the door subassembly 24 into the closed position (FIG. 2A).

When the door subassembly 24 reaches the closed position, the driver subassembly 28 may receive an instruction to deactivate the driver 124. In particular, the driver subassembly 28 may receive a signal causing the driveshaft 158 to stop rotating. For example, the sensor assembly 20 may include a second limit switch 172. In some configurations, the second limit switch 172 may be disposed between the actuator subassembly 26 and the housing subassembly 22. Accordingly, when the door subassembly 24 rotates from the second position (FIG. 2B) to the first position (FIG. 2A), the second limit switch 172 may be switched to an "OFF" position, thereby deactivating the driver 124.

A third mode of operation may begin with the door subassembly 24 in the closed position (FIG. 2A), as previously described, such that the first pin 90 is disposed on the primary ramp 130. During the third mode of operation, the driver subassembly 28 may receive an instruction to activate the driver 124. In particular, the driver 124 (e.g., a motor) may receive an activation signal causing the driver 124 to rotate in a first direction. For example, in some configurations, the end user of the motor vehicle may shift the motor vehicle into reverse, which may send the activation signal to the driver 124, causing the driveshaft 158 and the worm gear 160 to rotate in the first direction.

As the worm gear 160 rotates in the first direction, the worm gear 160 engages the gear teeth 152 of the drive mechanism 134, causing the spindle 122 to rotate in a second direction about the second axis of rotation 136. With reference to FIG. 2D, as the spindle 122 rotates in the second direction, the first pin 90 may disengage the primary ramp 130, and the second pin 92 may disengage the upper surface 72 of the control feature 70. In this regard, the force F1 of the biasing member 84 on the secondary actuator 82 may urge the primary actuator 80 in the first direction such that the second pin 92 engages the lower surface 74 of the control feature 70. As previously described, however, during the third mode of operation, the door subassembly 24 may be prevented from rotating about the rotational axis 40. For example, friction between various moving components in the sensor assembly 20, or an obstruction, such as ice or dirt, may prevent the door subassembly 24 from rotating into the open position (FIG. 2B). In particular, the torque generated by the force(s) preventing the door subassembly 24 from rotating into the open position may be greater than the first torque T1 generated by the force F1 of the biasing member 84. Accordingly, when the first pin 90 disengages the primary ramp 130, as previously described, the door subassembly 24 may not trigger the first limit switch 170. If the first limit switch 170 is not triggered because, for example, the door subassembly 24 does not rotate into the open position when the first pin 90 disengages the primary ramp 130, the driver 124 may remain activated such that the driveshaft 158 continues to rotate the spindle 122 in the second direction about the second axis of rotation 136.

As the spindle 122 continues to rotate, subsequent to the first pin 90 disengaging the primary ramp 130, the third pin 110 of the secondary actuator 82 may engage the secondary ramp 132. With reference to FIG. 2E, as the spindle 122 continues rotating in the second direction, the first pin 90 remains essentially stationary while the third pin 110 may engage the proximal end 142 of the secondary ramp 132 and continue moving along the secondary ramp 132 from the proximal end 142 to the distal end 144. In this regard, as the third pin 110 moves along the secondary ramp 132, the secondary actuator 82 may translate along the translational axis 46 within the chamber 94 of the primary actuator 80, in the direction of the stop surface 44, causing the third pin 110 to translate within the slot 100 of the primary actuator 80 and within the slot 43 of the cover 34. Translation of the secondary actuator 82 within the chamber 94 may further compress the biasing member 84 between the secondary actuator 82 and the cover 34, thus increasing the potential energy of the biasing member 84. As illustrated in FIG. 2E, as the secondary actuator 82 translates within the chamber 94 of the primary actuator 80, the first pin 90 may be suspended between the primary and secondary ramps 130, 132.

With reference to FIGS. 2F and 2G, as the spindle 122 continues to rotate, the third pin 110 may reach the distal end 144 of the secondary ramp (FIG. 2F) and disengage from the secondary ramp 132 (FIG. 2G). In particular, the third pin 110 may disengage from the distal end 144 of the secondary ramp 132. In this regard, the third pin 110 of the secondary actuator 82 and the first pin 90 of the primary actuator 80 may simultaneously disengage the primary and secondary ramps 130, 132. After the third pin 110 disengages the secondary ramp 132, the biasing member 84 may apply a force F2 on the secondary actuator 82, urging the secondary actuator 82 in the direction of the primary actuator 80. In particular, the force F2 may cause the secondary actuator 82 to translate within the chamber 94 of the primary actuator 80 away from the stop surface 44. It will be appreciated that the force F2 is greater than the force F1 due to the potential energy stored within the biasing member 84, as previously described. As the secondary actuator 82 translates along the translational axis 46, the third pin 110 may translate within the gap 146 until the secondary actuator 82 engages the primary actuator 80.

When the secondary actuator 82 engages the primary actuator 80, the kinetic energy generated by the force F2, which is greater than the force F1, is transmitted to the primary actuator 80. In this regard, the secondary actuator 82 may impact the primary actuator 80 to deliver an impulse momentum transfer from the secondary actuator 82 to the primary actuator 80. Accordingly, the second pin 92 of the primary actuator 80 may engage the lower surface 74 of the control feature 70 and produce a second torque impulse T2, greater than the first torque impulse T1, about the rotational axis 40 of the door subassembly 24. The second torque T2 may be greater than the previously-described torque produced by the force(s) (e.g., friction, ice, mud, etc.) preventing the door subassembly 24 from rotating into the open position. Accordingly, in the third mode of operation, the second torque T2 may cause the door subassembly 24 to rotate about the rotational axis 40, as previously described, into the open position (FIG. 2B). If the second torque T2 does not cause the door subassembly 24 to rotate about the rotational axis 40 during the third mode of operation, the sensor assembly 20 may repeat the third mode of operation one or more times. In this regard, the sensor assembly 20 may repeat the third mode of operation a predetermined number of times and/or repeat the third mode of operation until the door subassembly rotates about the rotational axis 40 into the open position. When the door subassembly 24 reaches the open position, the first limit switch 170 may be switched to the "OFF" position, as previously described, thereby deactivating the driver 124 and causing the spindle 122 to cease rotating.

The configuration of the sensor assembly 20, including the generation of the forces F1 and F2 and the torque impulses T1 and T2, may allow for the use of a driver 124 that produces less torque about the rotational axis of the driveshaft 158 than might otherwise be used and/or required in order to move the door subassembly 24 from the closed position to the open position. The use of a driver 124 that produces less torque about the rotational axis of the driveshaft 158 can, in turn, reduce or prevent the need for sensors and other devices that might otherwise be used to measure the torque and/or force produced by the door subassembly 24 upon moving from the open position to the closed position. Accordingly, the configuration of the sensor assembly 20 can result in a less complex (e.g., fewer components, smaller components, smaller packaging footprint, etc.) and less expensive sensor assembly than might otherwise be used and/or required.

Figure 5A:
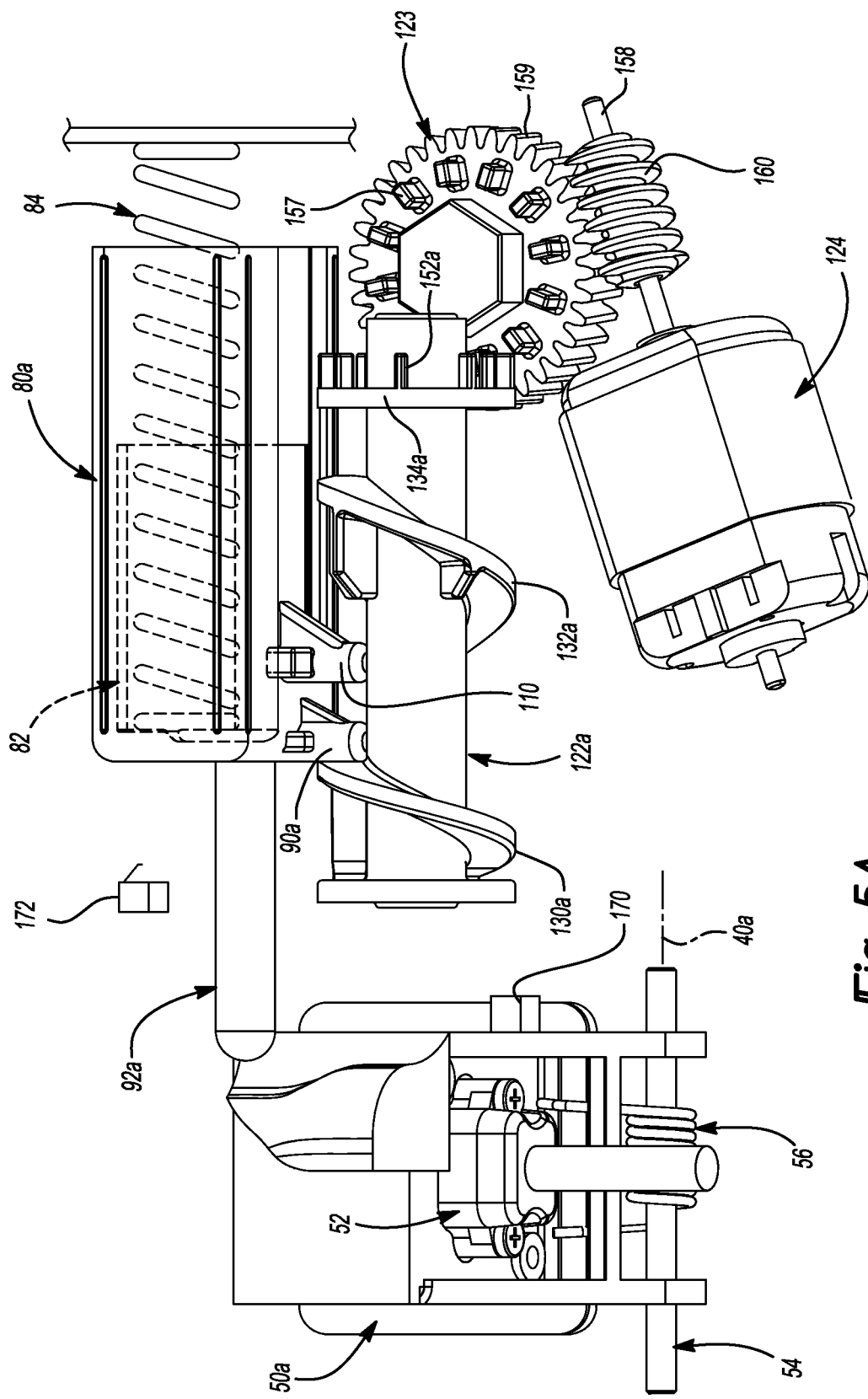
FIG. 5A is a perspective view of another closure assembly in a first position according to the principles of the present disclosure.
Figure 5B:
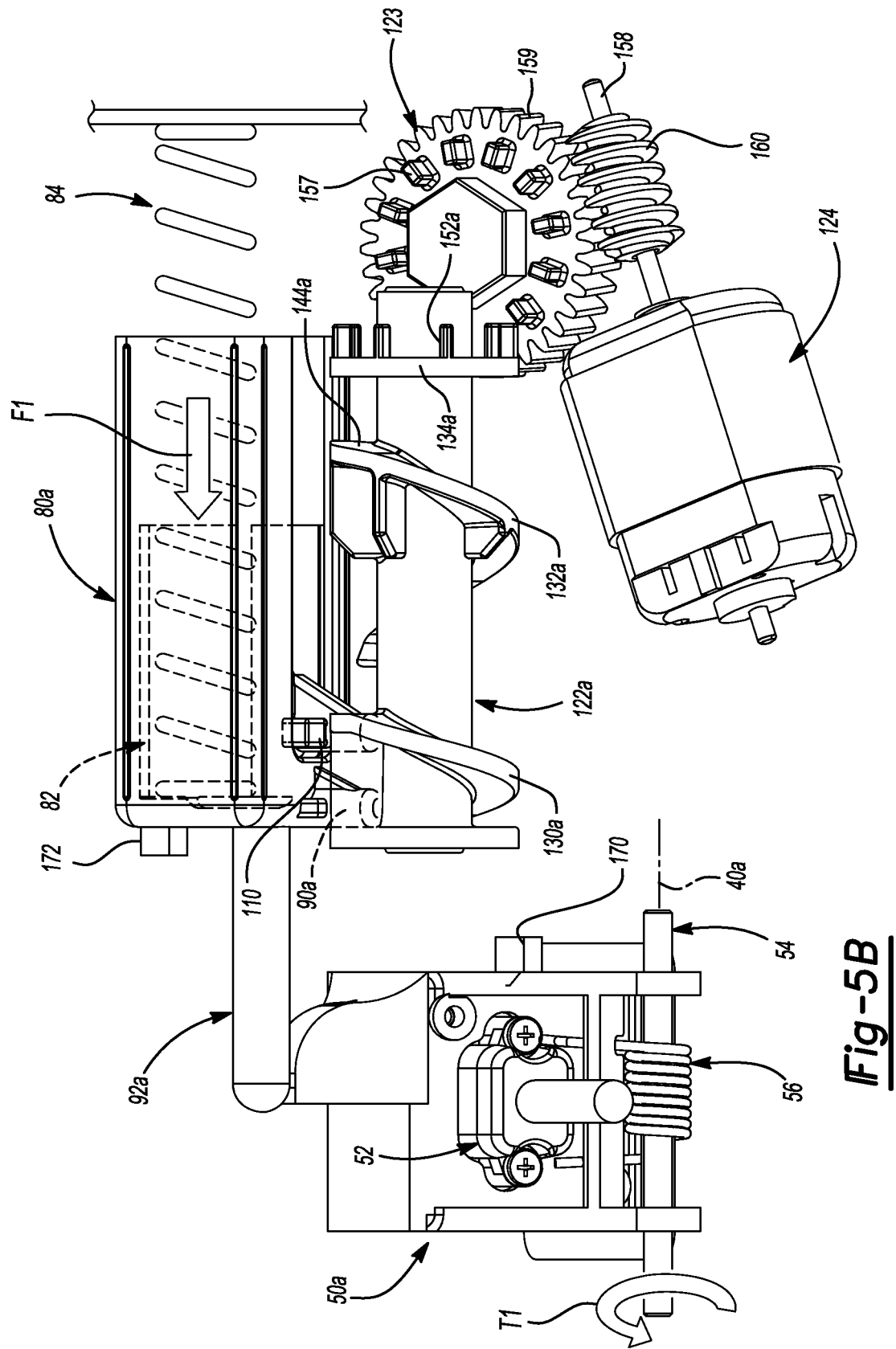
FIG. 5B is a perspective view of the closure assembly of FIG. 5A in a second position according to the principles of the present disclosure.
Figure 5C:
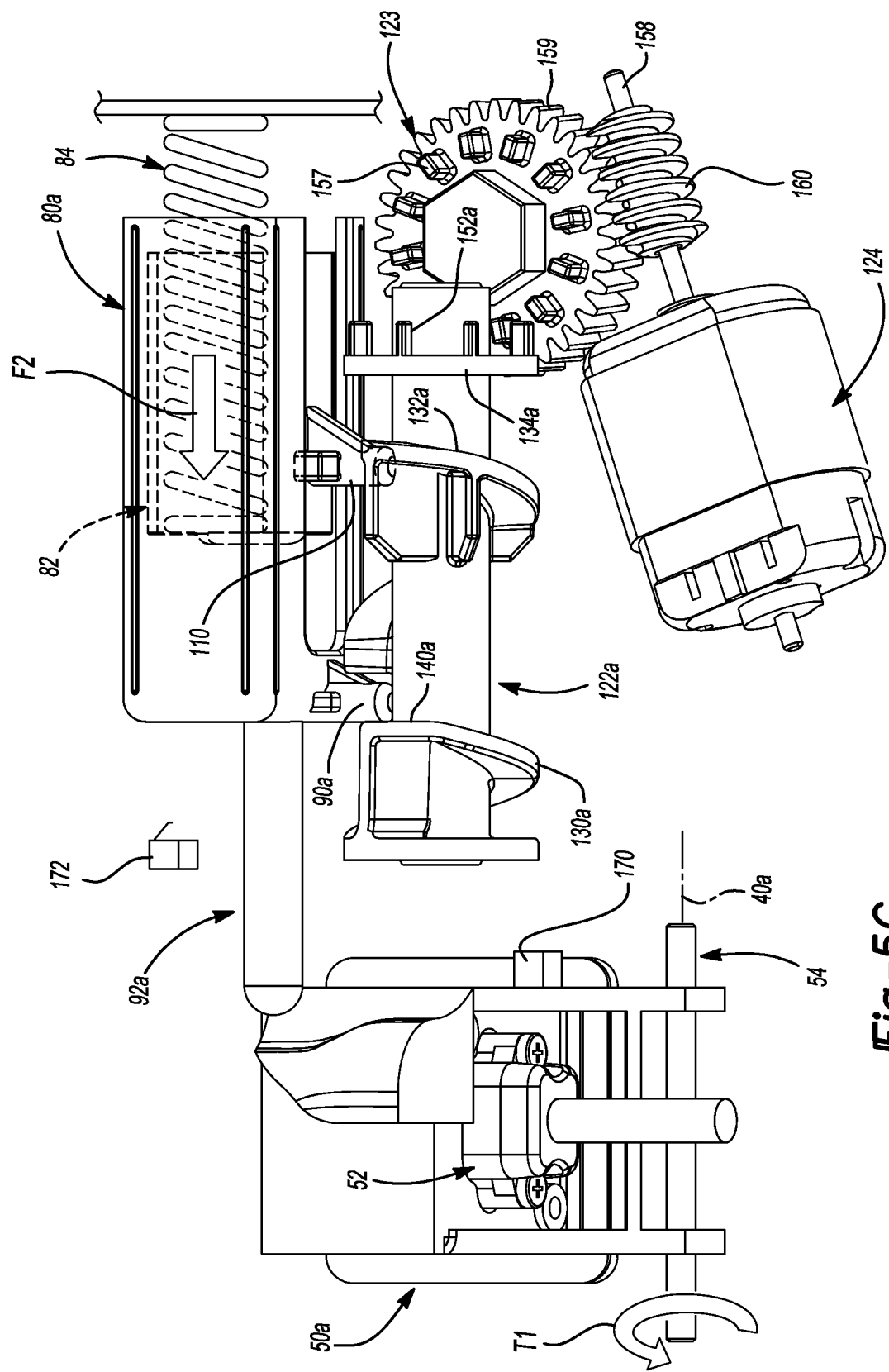
FIG. 5C is a perspective view of the closure assembly of FIG. 5A in a third position according to the principles of the present disclosure.

With reference to FIGS. 5A-5C, another sensor assembly 20a is shown. The structure and function of the sensor assembly 20a may be substantially similar to that of the sensor assembly 20, apart from any exceptions described below and/or shown in the figures. Accordingly, the structure and/or function of similar features will not be described again in detail. In addition, like reference numerals are used hereinafter and in the drawings to identify like features, while like reference numerals containing letter extensions (i.e., "a") are used to identify those features that have been modified.

The sensor assembly 20a may include a housing subassembly 22a, a door subassembly 24a, an actuator subassembly 26a, and a driver subassembly 28a. As illustrated in FIG. 6, the housing subassembly 22a may include a base 32a and a cover 34a. The door subassembly 24a may be mounted to the base 32a for rotation about a first axis of rotation 40a, such that the door subassembly 24a may be received within the aperture 36 of the base 32a in a closed position (FIG. 5A) and an open position (FIG. 5B).

The cover 34a may include a chamber 42a having a slot 43a and a stop surface 44a. The chamber 42a may define a generally prismatic construct (e.g., a circular cylinder, a rectangular cuboid, or other polygonal prism) having a first translational axis 46a extending through the stop surface 44a. As illustrated in FIG. 5A, the first translational axis 46a may extend in a direction substantially parallel (e.g., +/−5 degrees) to the first axis of rotation 40a. As will be explained in more detail below, in the assembled configuration, the chamber 42a may receive the actuator subassembly 24a for translation along the first translational axis 46a.

As illustrated in at least FIG. 6, the door subassembly 24a may include a door 50a, the sensing device 52, the axle 54, and the biasing member 56. The door 50a may include the baseplate 58, a first support arm 60a, and a second support arm 62a. The first and second support arms 60a, 62a may extend from the upper surface 64 of the baseplate 58. The second support arm 62a may include a control feature 70a.

The control feature 70a may include a ramp surface 72a. The ramp surface 72a may include an arcuate shape and/or construction extending from the second support arm 62a. In some configurations the ramp surface 72a may include a proximal portion 71a and a distal portion 73a. The proximal portion 71a may include a concave construction extending away from the second support arm 62a, and the distal portion 73a may include a convex construction extending away from the proximal portion 71a. In this regard, the proximal and distal portions 71a, 73a may define a spline curve extending from the second support arm 62a. Accordingly, a distance between a proximal end 76a of the control feature 70a and the second support arm 62a may be less than a distance from a distal end 78a of the control feature 70a and the second support arm 62a. As will be explained in more detail below, the control feature 70a can control the movement of the door 50a relative to the housing subassembly 22a.

As illustrated in FIGS. 5A and 6, the actuator subassembly 26a may include a primary actuator 80a, the secondary actuator 82, and the biasing member 84. The primary actuator 80a may include a block 88a, a first pin 90a, and a second pin 92a. The block 88a may include a generally hollow construct defining an inner chamber 94a. In some configurations, the block 88a may include a generally circular cylinder. It will be appreciated, however, that the block 88a may include other cross-sectional shapes and configurations, such as an ellipse, a square, or other polygonal shape, within the scope of the present disclosure. The block 88a may include a proximal end 96a, a distal end 98a opposite the proximal end 96a, and a slot 100a. The slot 100a may extend through the block 88a and into the chamber 94a from the distal end 98a toward the proximal end 96a. The proximal end 96a of the block 88a may include a stop surface 101a generally facing the distal end 98a of the block 88a.

The first pin 90a may extend from a first lateral side 102a of the block 88a, and the second pin 92a may extend from the proximal end 96a of the block 88a. In this regard, the first pin 90a may extend in a first direction and the second pin 92a may extend in a second direction that is transverse to the first direction. In some configurations, the first direction may be substantially perpendicular to the second direction such that the first pin 90a is substantially perpendicular to the second pin 92a.

In the assembled configuration, the slot 100a may extend in a direction substantially parallel to the first translational axis 46a. In this regard, the primary actuator 80a may be disposed within the chamber 42a of the cover 34a such that the distal end 98a faces the stop surface 44a of the cover 34a, and such that the chamber 42a is in communication with the inner chamber 94a of the block 88a. In particular, the primary actuator 80a may be translatably disposed within the chamber 42a such that the block 88a can translate in a direction substantially parallel to the first translational axis 46a and to the slot 100a. In the assembled configuration, the first pin 90a may extend through the slot 43a of the cover 34a, and the second pin 92a may engage the control feature 70a (e.g., the ramp surface 72a) of the door 50a.

As illustrated in FIGS. 5A and 6, the driver subassembly 28a may include a spindle 122a, a first drive mechanism 123, and the driver 124. The spindle 122a may include a proximal end 126a, a distal end 128a, a primary ramp 130a, a secondary ramp 132a, and a second drive mechanism 134a. The second drive mechanism 134a may include a gear wheel 150a. In some configurations, the gear wheel 150a may be disposed proximate to the distal end 128a of the spindle 122a. The gear wheel 150a may include a series of gear teeth 152a. Rotation of the gear wheel 150a may cause the spindle 122a to rotate about a second axis of rotation 136a that extends in a direction substantially parallel (e.g., +/−5 degrees) to the first axis of rotation 40a.

The first drive mechanism 123 may include a gear wheel 153 configured to rotate about a third axis of rotation 155. The third axis of rotation 155 may extend in a direction transverse to the second axis of rotation 136a. For example, in some configurations the third axis of rotation 155 may extend in a direction generally perpendicular to the second axis of rotation 136a. In some configurations, the gear wheel 153 may be disposed proximate to the distal end 128a of the spindle 122a. The gear wheel 153 may include a first series of gear teeth 157 configured to engage the gear teeth 152a of the gear wheel 150a and a second series of gear teeth 159 configured to engage the worm gear 160 of the driver 124. Accordingly, rotation of the worm gear 160 may rotate the gear wheel 153, which causes the gear wheel 150a and the spindle 122a to rotate about the second axis of rotation 136a.

A method of operating the sensor assembly 20a will now be described with reference to FIGS. 5A-5C. As previously discussed, the method of operating the sensor assembly 20a may be substantially similar to the method of operating the sensor assembly 20, except as otherwise provided herein. Accordingly, only the differences between the method of operating the sensor assembly 20a and the method of operating the sensor assembly 20 will be described in detail herein.

As illustrated in FIG. 5A, a first mode of operation may begin with the door subassembly 24a in a closed position. As the worm gear 160 rotates in the first direction, the worm gear 160 engages the gear teeth 159 of the gear wheel 153, causing the spindle 122a to rotate in a second direction about the second axis of rotation 136a. As the spindle 122a rotates in the second direction, the first pin 90a may disengage the primary ramp 130a. In particular, the first pin 90a may translate in a first direction, substantially parallel to the translational axis 146a, from the distal end 140a of the primary ramp 130a to the proximal end 138a of the primary ramp 130a. In this regard, the biasing member 84 may apply the force F1 on the secondary actuator 82, urging the secondary actuator 82 in the direction of the primary actuator 80a, and, in turn, urging the primary actuator 80a in the first direction. As the first pin 90a translates in the first direction, the first pin 90a of the primary actuator 80a and the third pin 110 of the secondary actuator 82 may translate within the slot 43a of the cover 34a, and the second pin 92a of the primary actuator 80a may engage the control feature 70a of the door subassembly 24a. In this regard, the second pin 92a may move along (e.g., slide) the ramp surface 72a of the control feature 70a. In particular, the second pin 92a may slide from the proximal portion 71a of the ramp surface 72a to the distal portion 73a of the ramp surface 72a. For example, the second pin 92a may slide along the concave portion of the proximal portion 71a to the convex portion of the distal portion 73a. In this regard, the second pin 92a may apply a force on the ramp surface 72a, creating the first torque T1 about the rotational axis 40a of the door subassembly 24a, and causing the door subassembly 24a to rotate about the rotational axis 40a. As the door subassembly 24a rotates about the rotational axis 40a into the open position (FIG. 5B), the second pin 92a may slide across the control feature 70a from the end 76a to the end 78a until the door subassembly 24a reaches the open position. When the door subassembly 24a rotates from the closed position (FIG. 5A) to the open position (FIG. 5B), the first limit switch 170 may be switched to an "OFF" position, thereby deactivating the driver 124.

During a second mode of operation, as the spindle 122a rotates in the second direction, the first pin 90a may move along the primary ramp 130a from the proximal end 138a to the distal end 140a. As the first pin 90a moves along the primary ramp 130a, the second pin 92a of the primary actuator 80a may move along (e.g., slide) the ramp surface 72a of the control feature 70a as the primary and secondary actuators 80a, 82 translate along the translational axis 46a within the chamber 42a of the cover 34a. In particular, the second pin 92a may slide from the distal portion 73a of the ramp surface 72a to the proximal portion 71a of the ramp surface 72a. For example, the second pin 92a may slide along the convex portion of the distal portion 73a to the concave portion of the proximal portion 71a. As the second pin 92a slides along the ramp surface 72a, the biasing member 56 may apply a torque about the rotational axis 40 that is opposite the first torque T1 produced by the second pin 92a. Accordingly, the biasing member 56 may cause the door subassembly 24a to rotate about the rotational axis 40a from the open position (FIG. 5B) to the closed position (FIG. 5A). Accordingly, as the primary and secondary actuators 80a, 82 translate within the chamber 42a towards the stop surface 44a, the secondary actuator 82 may compress the biasing member 84 as the biasing member 56 moves the door subassembly 24a into the closed position.

During a third mode of operation, the driveshaft 158 and the worm gear 160 may rotate in the first direction, causing the spindle 122a to rotate in the second direction about the second axis of rotation 136a. As the spindle 122a rotates in the second direction, the first pin 90a may disengage the primary ramp 130a, and the second pin 92a may engage the ramp surface 72a of the control feature 70a. As previously described, however, during the third mode of operation, the door subassembly 24a may be prevented from rotating about the rotational axis 40a. For example, friction between various moving components in the sensor assembly 20a, or an obstruction, such as ice or mud, may prevent the door subassembly 24a from rotating into the open position (FIG. 5B). In particular, the torque generated by the force(s) preventing the door subassembly 24a from rotating into the open position may be greater than the first torque T1 generated by the force F1 of the biasing member 84. Accordingly, when the first pin 90a disengages the primary ramp 130a, as previously described, the door subassembly 24a may not trigger the first limit switch 170. If the first limit switch 170 is not triggered because, for example, the door subassembly 24a does not rotate into the open position when the first pin 90a disengages the primary ramp 130a, the driver 124 may remain activated such that the driveshaft 158 continues to rotate the spindle 122a in the second direction about the second axis of rotation 136a.

As the spindle 122a continues rotating in the second direction, the third pin 110 may engage the proximal end 142a of the secondary ramp 132a and continue moving along the secondary ramp 132a from the proximal end 142a to the distal end 144a. As the third pin 110 moves along the secondary ramp 132a, the secondary actuator 82a may translate along the translational axis 46a within the chamber 94a of the primary actuator 80a, in the direction of the stop surface 44a, causing the third pin 110 to translate within the slot 100a of the primary actuator 80a and within the slot 43a of the cover 34a. Translation of the secondary actuator 82 within the chamber 94a may further compress the biasing member 84 between the secondary actuator 82 and the cover 34a, thus increasing the potential energy of the biasing member 84.

With reference to FIG. 5C, as the spindle 122a continues to rotate, the third pin 110 may disengage the secondary ramp 132a. In particular, the third pin 110 may disengage from the distal end 144a of the secondary ramp 132a. In this regard, the third pin 110 of the secondary actuator 82 and the first pin 90a of the primary actuator 80a may simultaneously disengage the primary and secondary ramps 130a, 132a. After the third pin 110 disengages the secondary ramp 132a, the biasing member 84 may apply the force F2 on the secondary actuator 82, urging the secondary actuator 82 in the direction of the primary actuator 80a. In particular, the force F2 may cause the secondary actuator 82 to translate within the chamber 94a of the primary actuator 80a, away from the stop surface 44a, until the secondary actuator 82 engages the primary actuator 80a. It will be appreciated that the force F2 is greater than the force F1 due to the potential energy stored within the biasing member 84, as previously described. Accordingly, when the secondary actuator 82 engages the primary actuator 80a, the kinetic energy generated by the force F2 is transmitted to the primary actuator 80a. Accordingly, the second pin 92a of the primary actuator 80a may engage the ramp surface 72a of the control feature 70a and produce the second torque T2, greater than the first torque T1, about the rotational axis 40a of the door subassembly 24a. The second torque T2 may be greater than the previously-described torque produced by the force(s) (e.g., friction, ice, mud, etc.) preventing the door subassembly 24a from rotating into the open position. Accordingly, in the third mode of operation, the second torque T2 may cause the door subassembly 24a to rotate about the rotational axis 40a, as previously described, into the open position (FIG. 5B). When the door subassembly 24a reaches the open position, the first limit switch 170 may be switched to the "OFF" position, as previously described, thereby deactivating the driver 124 and causing the spindle 122a to cease rotating.

Figure 7:
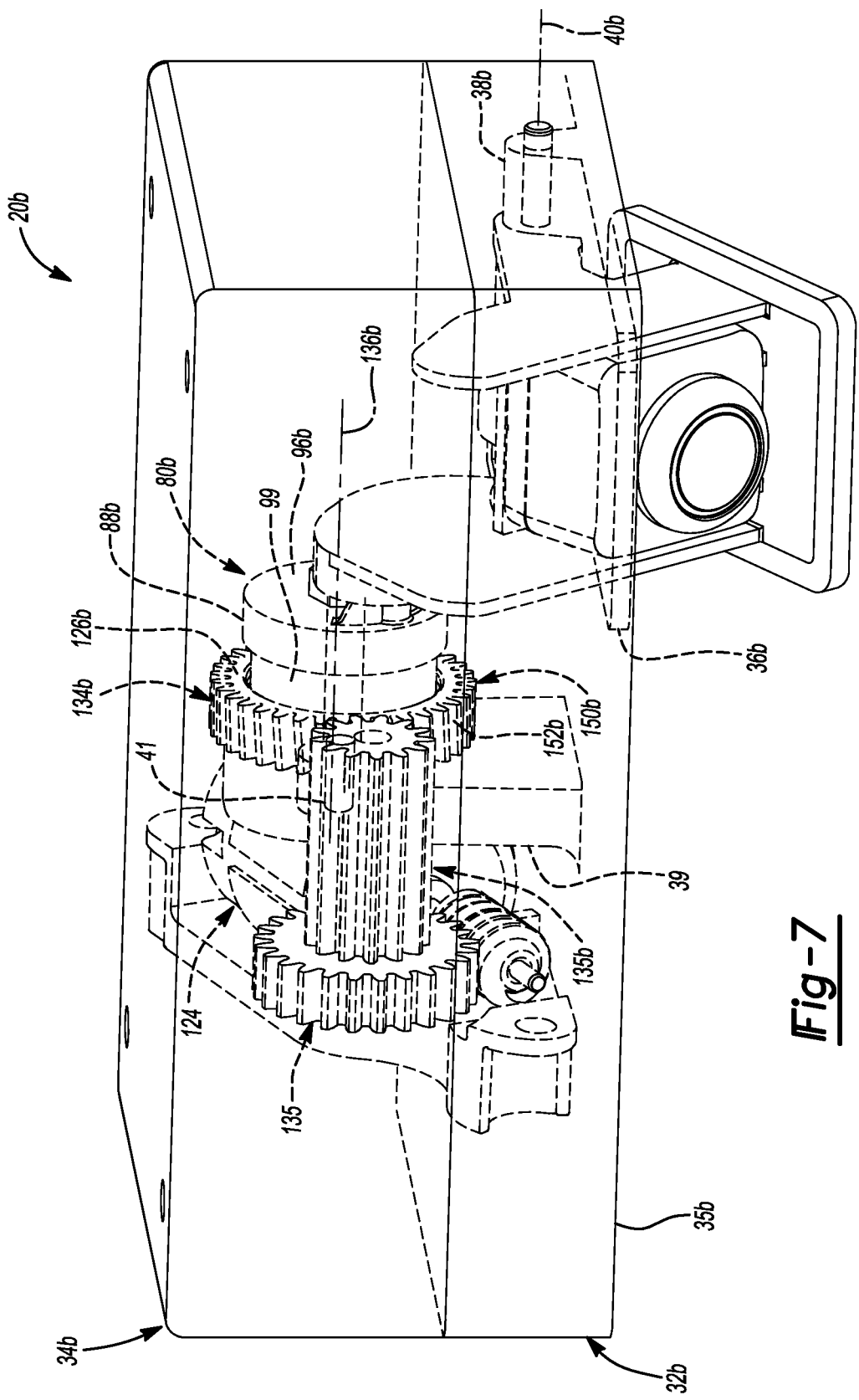
FIG. 7 is a perspective view of another closure assembly according to the principles of the present disclosure.

With reference to FIGS. 7-9, another sensor assembly 20b is shown. The structure and function of the sensor assembly 20b may be substantially similar to that of the sensor assembly 20, apart from any exceptions described below and/or shown in the figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

Figure 8A:
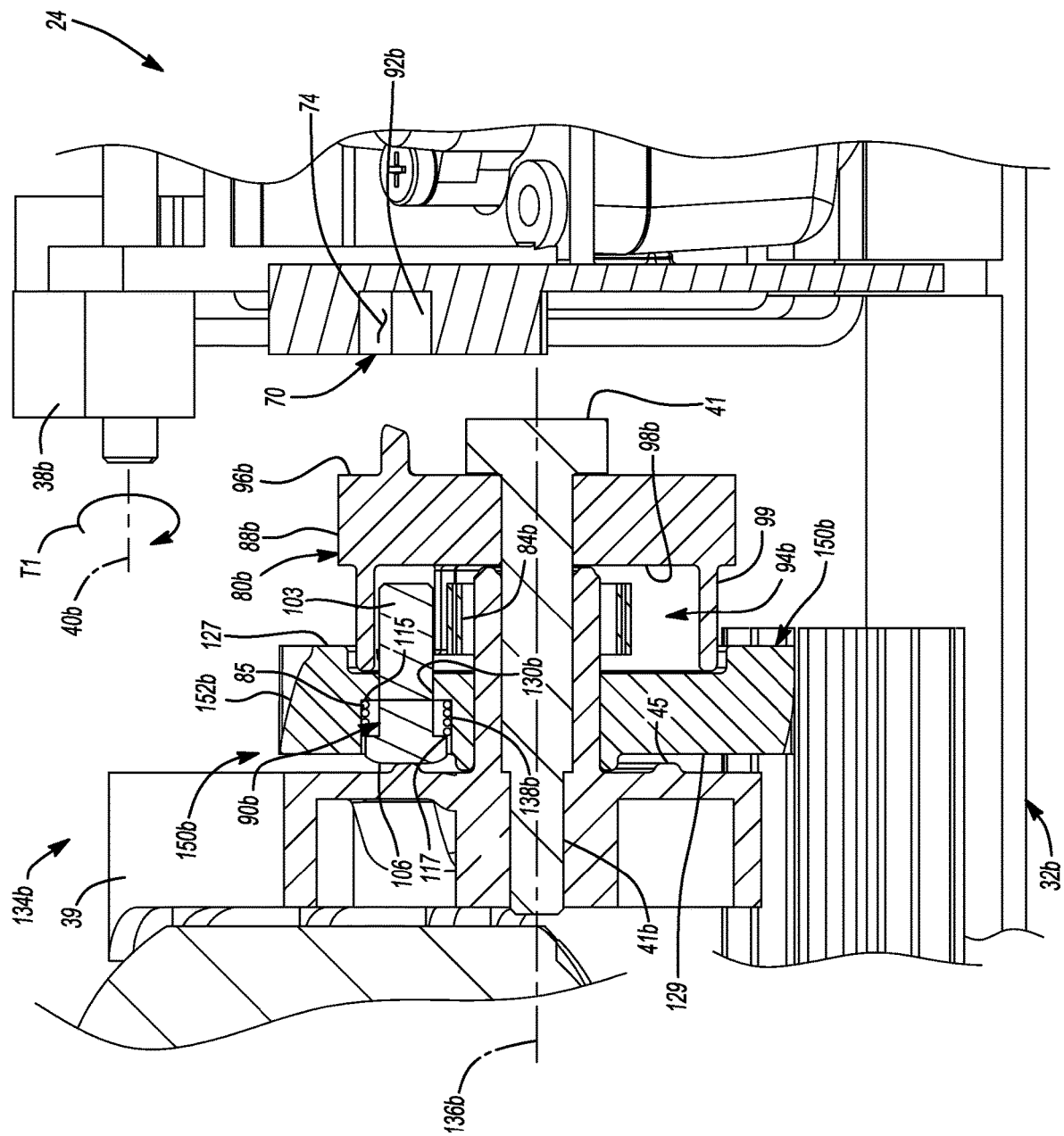
FIG. 8A is a sectional view of the closure assembly of FIG. 7 in a first position according to the principles of the present disclosure.
Figure 8B:
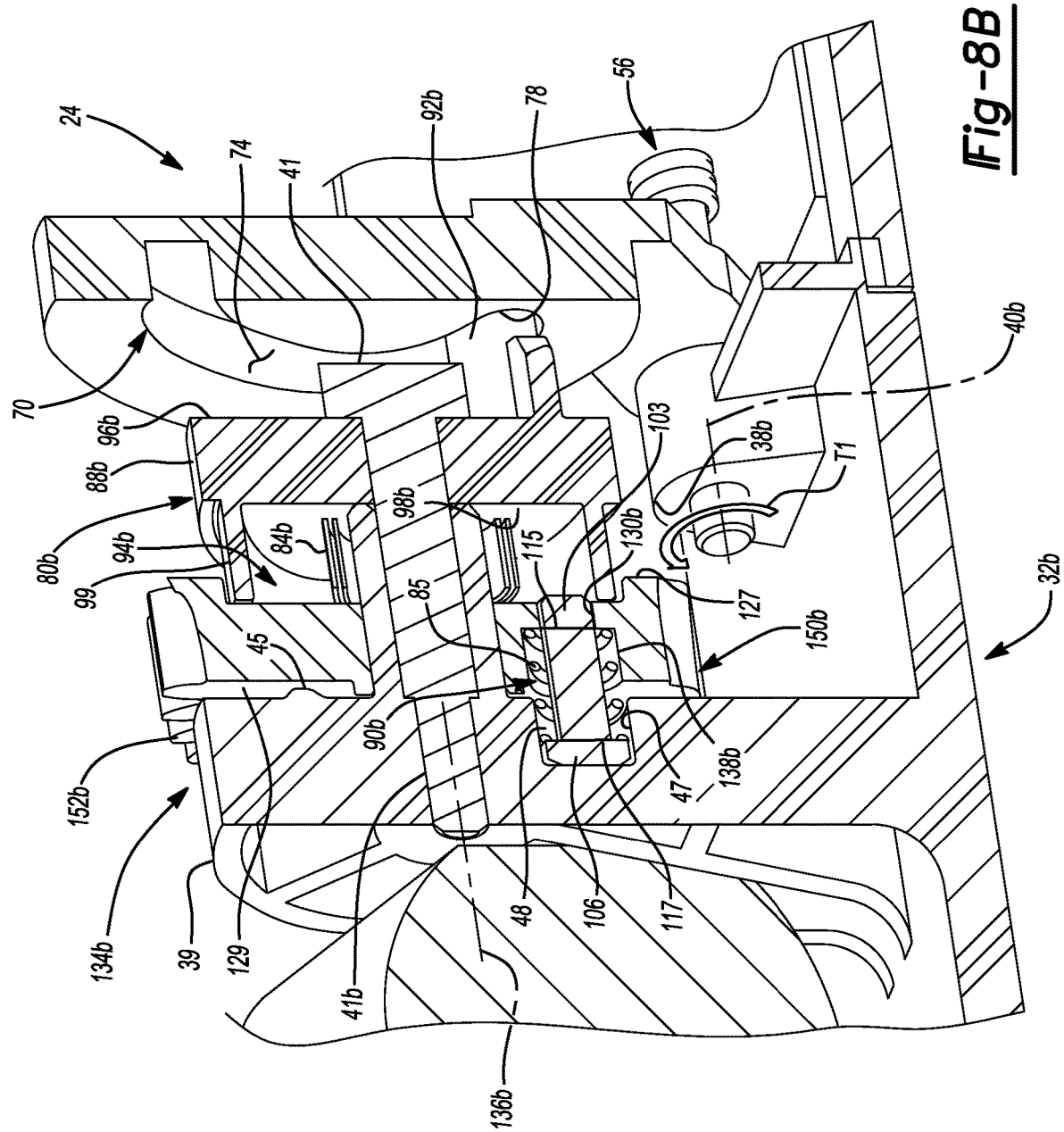
FIG. 8B is a sectional view of the closure assembly of FIG. 7 in a second position according to the principles of the present disclosure.

As illustrated in FIG. 9, the sensor assembly 20b may include a housing subassembly 22b, the door subassembly 24, an actuator subassembly 26b, and a driver subassembly 28b. The housing subassembly 22b may include a base 32b and a cover 34b. With reference to FIG. 7, the base 32b may include a lower surface 35b, an aperture 36b, a rotation feature 38b (e.g., a hub and/or an axle), and a support 39. The aperture 36b may extend through the base 32b such that the lower surface 35b generally surrounds the aperture 36b. The rotation feature 38b may define a first axis of rotation 40b. As will be explained in more detail below, in an assembled configuration, the aperture 36b and rotation feature 38b may receive the door subassembly 24. In particular, the door subassembly 24 may be mounted to the rotation feature 38b for rotation about the first axis of rotation 40b such that the door subassembly 24 is receivable within the aperture 36b in a stowed or closed position (FIG. 8A) and a deployed or open position (FIG. 8B).

The support 39 may include a rotation feature 41 (e.g., a hub and/or an axle), an annular rib 45, and a recess 47. The rotation feature 41 may define a second axis of rotation 136b. As illustrated in FIG. 8A, the second axis of rotation 136b may extend in a direction substantially parallel (e.g., +/−5 degrees) to the first axis of rotation 40b. As will be explained in more detail below, the actuator subassembly 26b may be mounted to the rotation feature 41 for rotation about the second axis of rotation 136b. The annular rib 45 may surround the second axis of rotation 136b. In this regard, the annular rib 45 may extend from the support 39 in an axial direction relative to the second axis of rotation 136b. As will be explained in more detail below, in an assembled configuration, the annular rib 45 may guide the rotation of the actuator subassembly 26b relative to the housing subassembly 22b.

The recess 47 may be formed in the support 39. In particular, the recess 47 may extend into the support 39 in an axial direction relative to the second axis of rotation 136b. The recess 47 may include a ramp surface 48. As will be explained in more detail below, in the assembled configuration, the recess 47 may receive a pin 90b of the actuator subassembly 26 and thus allow the pin 90b to move in a first axial direction relative to the second axis of rotation 136b. The ramp surface 48 may engage the pin 90b of the actuator subassembly 26 and thus allow the pin 90b to move in a second axial direction (opposite the first axial direction) relative to the second axis of rotation 136b.

As illustrated in FIGS. 8A and 9, the actuator subassembly 26b may include an actuator 80b, a first biasing member 85, and a second biasing member 84b. As illustrated in FIG. 9, the actuator 80b may include a block 88b, the first pin 90b, and a second pin 92b. The block 88b may include a proximal end 96b and a distal end 98b opposite the proximal end 96b. An annular flange 99 may extend from the distal end 98b of the block 88b, such that the annular flange 99 and the distal end 98b of the block 88b define a chamber 94b A catch 101 may extend radially (relative to the second axis of rotation 136b) from the annular flange 99 and/or axially (relative to the second axis of rotation 136b) from the distal end 98b. In this regard, the catch 101 may be disposed within the chamber 94b.

The first pin 90b may include a stem portion 103 and a head portion 106 supported by the stem portion 103. As will be explained in more detail below, in the assembled configuration, the first pin 90b may be translatably disposed within the actuator subassembly 26*b* and/or the driver subassembly 28*b*. In this regard, the first pin 90*b* may be supported by the driver subassembly 28*b* for translation in a direction generally parallel (+/−5 degrees) to the second axis of rotation 136*b* or for orbital movement about the second axis of rotation 136*b*. The second pin 92*b* may extend from the proximal end 96*b* of the block 88*b* in a direction substantially parallel (+/−5 degrees) to the first pin 90*b*, such that, in the assembled configuration, the second pin 92*b* is received within the control feature 70 of the door subassembly 24.

The first biasing member 85 may include a proximal end 115 and a distal end 117. In some configurations, the first biasing member 85 may be a compression coil spring extending from the proximal end 115 to the distal end 117. In the assembled configuration, the first biasing member 85 may be disposed about the stem portion 103 of the first pin 90*b*. For example, the first biasing member 85 may be disposed about the stem portion 103 such that the proximal end 115 engages the driver subassembly 28*b* and the distal end 117 engages the head portion 106 of the first pin 90*b*. Accordingly, as will be explained in more detail below, upon translation of the first pin 90*b* in the direction of the door subassembly 24*b*, the first pin 90*b* may compress the first biasing member 85.

As illustrated in FIG. 9, the second biasing member 84*b* may include a proximal end 126*b* and a distal end 128*b*. The second biasing member 84*b* may be disposed about the second axis of rotation 136*b* such that the proximal end 126*b* engages the housing subassembly 22*b* and the distal end 128*b* is configured to selectively engage the actuator subassembly 26*b*. In particular, the second biasing member 84*b* may be disposed within the chamber 94*b* of the block 88*b*, such that the proximal end 126*b* engages the rotation feature 41 of the base 32*b*, and the distal end 128*b* engages the catch 101 of the actuator subassembly 22*b*. In this regard, the second biasing member 84*b* may include a clock spring. Accordingly, as will be explained in more detail below, winding the second biasing member 84*b* may increase the elastic potential energy stored within the second biasing member 84*b*.

As illustrated in FIGS. 7 and 9, the driver subassembly 28*b* may include the driver 124, a drive mechanism 134*b*, and one or more gears 135. The drive mechanism 134*b* may include a proximal end 127, a distal end 129, an aperture 130*b*, and a gear wheel 150*b*. In the assembled configuration, the drive mechanism 134*b* may be supported by the housing subassembly 22*b* for rotation about the second axis of rotation 136*b*. In this regard, the proximal and distal ends 127, 129 may define generally radially extending surfaces relative to the second axis of rotation 136*b*.

The aperture 130*b* may extend through the proximal and distal ends 127, 129 of the drive mechanism 134*b*. In particular, the aperture 130*b* may extend in an axial direction relative to the second axis of rotation 136*b*. As illustrated in FIG. 8A, the aperture 130*b* may include a counterbore portion 138*b* formed in the distal end 129 of the drive mechanism 134*b*. As will be explained in more detail below, in the assembled configuration, the aperture 130*b* may receive the first pin 90*b* for translation therein. In this regard, the counterbore portion 138*b* may be configured to intermittently receive the head portion 106 of the first pin 90*b* as the first pin 90*b* translates within the aperture 130*b*.

The gear wheel 150*b* may include a series of gear teeth 152*b* extending radially outward relative to the second axis of rotation 136*b*. Accordingly, rotation of the gear wheel 150*b* may cause the drive mechanism 134*b* to rotate about the second axis of rotation 136*b*.

The driver 124 may be configured to rotate the drive mechanism 134*b* about the second axis of rotation 136*b*. For example, in the assembled configuration, the worm gear 160 may be engaged with the gears 135, such that rotation of the worm gear 160 causes the drive mechanism 134*b* to rotate about the second axis of rotation 136*b*.

A method of operating the sensor assembly 20*b* will now be described with reference to FIGS. 8A and 8B. As previously discussed, the method of operating the sensor assembly 20*b* may be substantially similar to the method of operating the sensor assembly 20, except as otherwise provided herein. Accordingly, only the differences between the method of operating the sensor assembly 20*b* and the method of operating the sensor assembly 20 will be described in detail herein.

As illustrated in FIG. 8A, a first mode of operation may begin with the door subassembly 24 in a closed position. As the worm gear 160 rotates in the first direction, the worm gear 160 engages one of the gears 135, causing the drive mechanism 134*b* to rotate in a second direction about the second axis of rotation 136*b*. As the drive mechanism 134*b* rotates in the second direction, the head portion 106 of the first pin 90*a* may move along the annular rib 45 and the stem portion 103 of the first pin 90*a* may engage the catch 101 of the actuator 80*b*. In this regard, the first pin 90*a* may orbit about second axis of rotation 136*b*, causing the actuator 80*b* to rotate about the second axis of rotation 136*b*. As the actuator 80*b* rotates about the second axis of rotation 136*b*, the catch 101 engages the distal end 128*b* of the second biasing member 84*b* in order to wind, and increase the potential energy of, the second biasing member 84*b*.

The first pin 90*a* may slide along the annular rib 45 of the support 39 until the first pin 90*b* is aligned with the recess 47. In this regard, once the first pin 90*b* is aligned with the recess 47, the first biasing member 85 may apply a force on the head portion 106 of the first pin 90*b*, causing the first pin 90*b* to translate within the aperture 130*b* until the head portion 106 is disposed within the recess 47 of the support 39. Once the head portion 106 is disposed within the recess 47, the distal end 128*b* of the second biasing member 84*b* may engage the catch 101 such that the force of the second biasing member 84*b* urges the actuator 80*a* to rotate in the first direction about the second axis of rotation 136*b*.

As the actuator 80*b* rotates in the first direction about the second axis of rotation 136*b*, the second pin 92*b* may translate within the control feature 70 of the door subassembly 24. For example, the second pin 92*b* may engage the lower surface 74 of the control feature 70. In this regard, the second pin 92*b* may apply a force on the lower surface 74, creating the first torque T1 about the rotational axis 40*b* of the door subassembly 24, and causing the door subassembly 24 to rotate about the rotational axis 40*b*. In some configurations, the biasing member 56 may cause the door subassembly 24 to rotate about the rotational axis 40*b* in lieu of, or in addition to, the first torque T1 created by the second pin 92*b*. As the door subassembly 24 rotates about the rotational axis 40*b* into the open position (FIG. 8B), the second pin 92*b* may translate within the control feature 70 to the end 78 until the door subassembly 24 reaches the open position.

During a second mode of operation, as the drive mechanism 134*b* rotates in the second direction, the first pin 90*a* may exit the recess 47. In particular, the first pin 90*a* may slide along the ramp surface 48 of the support 39 until the head portion 106 has exited the recess 47. In this regard, as the first pin 90*a* exits the recess 47, the head portion 106 and the support 39 may compress the first biasing member 85. Once the first pin 90a has exited the recess 47, the head portion 106 may slide along the annular rib 45 of the support 39 while the stem portion 103 engages the catch 101, thus causing the actuator 80b to rotate in the second direction about the second axis of rotation 136b. As the actuator 80b rotates about the second axis of rotation 136b, the catch 101 engages the distal end 128b of the second biasing member 84b in order to wind, and increase the potential energy of, the second biasing member 84b, as previously described.

As the actuator 80b rotates about the second axis of rotation 136b, the second pin 92b of the actuator 80b may translate within the control feature 70 of the door subassembly 24. In this regard, the second pin 92b may disengage the end 78 of the control feature 70 and engage the upper surface 72 of the control feature 70. The second pin 92b may apply a force on the upper surface 72, creating a torque about the rotational axis 40b of the door subassembly 24, and causing the door subassembly 24 to rotate about the rotational axis 40b. The torque created by the second pin 92b may be greater than an opposing torque generated by the biasing member 56 and/or the second biasing member 84b. Accordingly, as the actuator 80 rotates in the second direction, the actuator 80b may compress the second biasing member 84b as the second pin 92b moves the door subassembly 24 into the closed position (FIG. 8A).

During a third mode of operation, the drive mechanism 134b may rotate in the second direction until the first pin 90b is aligned with the recess 47 of the support 39. As previously described, however, during the third mode of operation, the door subassembly 24 may be prevented from rotating about the rotational axis 40b. For example, friction between various moving components in the sensor assembly 20b, or an obstruction, such as ice or mud, may prevent the door subassembly 24 from rotating into the open position (FIG. 8B). In particular, the torque generated by the force(s) preventing the door subassembly 24 from rotating into the open position may be greater than the first torque T1 generated by the force of the second biasing member 84b. Accordingly, when the first pin 90b is aligned with the recess 47, as previously described, the door subassembly 24 may not trigger the first limit switch 170. If the first limit switch 170 is not triggered because, for example, the door subassembly 24 does not rotate into the open position when the first pin 90b is aligned with the recess 47, the driver 124 may remain activated such that the driveshaft 158 continues to rotate the drive mechanism 134b in the second direction about the second axis of rotation 136b.

As the drive mechanism 134b continues rotating in the second direction, the second pin 92b may remain engaged with the catch 101 in order to rotate the actuator 80b about the second axis of rotation 136b. As the actuator 80b rotates about the second axis of rotation 136b, the catch 101 engages the distal end 128b of the second biasing member 84b in order to wind, and increase the potential energy of, the second biasing member 84b, as previously described.

With reference to FIGS. 8A and 8B, the drive mechanism 134b may continue rotating in the second direction until the first pin 90b is aligned with the recess 47 of the support 39. In this regard, the drive mechanism 134b may rotate at least 360 degrees. Once the first pin 90b is aligned with the recess 47, such that the head portion 106 is received within the recess 47, the second biasing member 84b may apply the force F2 on the catch 101, urging the actuator 80b to rotate in the first direction. In particular, the force F2 may cause the actuator 80b to rotate with the kinetic energy generated by the force F2, which is greater than the force F1. Accordingly, the second pin 92b may engage the lower surface 74 of the control feature 70 and produce the second torque T2, greater than the first torque T1, about the rotational axis 40b of the door subassembly 24. The second torque T2 may be greater than the previously-described torque produced by the force(s) (e.g., friction, ice, mud, etc.) preventing the door subassembly 24 from rotating into the open position. Accordingly, in the third mode of operation, the second torque T2 may cause the door subassembly 24 to rotate about the rotational axis 40b, as previously described, into the open position (FIG. 8B). When the door subassembly 24 reaches the open position, the first limit switch 170 may be switched to the "OFF" position, as previously described, thereby deactivating the driver 124 and causing the drive mechanism 134b to cease rotating.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A closure assembly comprising:
    a housing;
    a sensor disposed within the housing;
    a door supported by the housing, the door being movable between a closed position and an open position, the sensor being exposed when the door is in the open position; and
    a primary actuator operable to (i) apply a first force on the door to move the door from the closed position to the open position and (ii) apply a second force on the door to move the door from the closed position to the open position when the first force does not move the door into the open position,
    wherein the door includes a control feature and the primary actuator includes a pin that engages the control feature to rotate the door from the closed position to the open position.

2. The closure assembly of claim 1, wherein the second force is greater than the first force.

3. The closure assembly of claim 1, wherein the control feature includes a slot.

4. The closure assembly of claim 3, wherein the slot includes a first cam surface and a second cam surface, the first cam surface operable to control movement of the door from the closed position to the open position, the second cam surface operable to control movement of the door from the open position to the closed position.

5. The closure assembly of claim 1, wherein the control feature includes a ramped surface.

6. The closure assembly of claim 5, wherein the ramped surface includes a concave portion and a convex portion extending from the concave portion.

7. The closure assembly of claim 1, further comprising a spindle and a driver operable to rotate the spindle, the spindle including a first ramp that engages the primary actuator and a second ramp that engages a secondary actuator.

8. The closure assembly of claim 7, wherein the driver includes at least one of a motor and a shape-memory alloy that rotates the spindle.

9. The closure assembly of claim 8, wherein the driver rotates the spindle in a first direction about an axis of rotation to move the door from the closed position to the open position, and wherein the driver rotates the spindle in the first direction about the axis of rotation to rotate the door from the open position to the closed position.

10. The closure assembly of claim 1, wherein the door is supported by the housing for rotation about an axis, the first force producing a first torque about the axis and the second force producing a second torque about the axis.

11. The closure assembly of claim 10, wherein the second torque is greater than the first torque.

12. A closure assembly comprising:
a housing;
a sensor disposed within the housing;
a door supported by the housing, the door being movable between a closed position and an open position, the sensor being exposed when the door is in the open position;
a primary actuator operable to transmit a first impact to the door to move the door from the closed position to the open position;
a secondary actuator operable to transmit a second impact to the door to move the door from the closed position to the open position when the first impact does not move the door into the open position.

13. The closure assembly of claim 12, wherein a force generated by the second impact is greater than a force generated by the first impact.

14. The closure assembly of claim 12, further comprising an energy storage device configured to store a first amount of energy and a second amount of energy greater than the first amount of energy, the first amount of energy producing the first impact, the second amount of energy producing the second impact.

15. A closure assembly comprising:
a housing;
a sensor disposed within the housing;
a door supported by the housing, the door being movable between a closed position and an open position, the sensor being exposed when the door is in the open position;
a primary actuator operable to (i) apply a first force on the door to move the door from the closed position to the open position and (ii) apply a second force on the door to move the door from the closed position to the open position when the first force does not move the door into the open position;
a spindle; and
a driver operable to rotate the spindle, the spindle including a first ramp that engages the primary actuator and a second ramp that engages a secondary actuator.

16. The closure assembly of claim 15, wherein the driver includes at least one of a motor and a shape-memory alloy that rotates the spindle.

17. The closure assembly of claim 16, wherein the driver rotates the spindle in a first direction about an axis of rotation to move the door from the closed position to the open position, and wherein the driver rotates the spindle in the first direction about the axis of rotation to rotate the door from the open position to the closed position.

18. The closure assembly of claim 15, wherein the door is supported by the housing for rotation about an axis, the first force producing a first torque about the axis and the second force producing a second torque about the axis.

19. The closure assembly of claim 18, wherein the second torque is greater than the first torque.

20. The closure assembly of claim 15, wherein the second force is greater than the first force.

* * * * *